(12) United States Patent
Yan et al.

(10) Patent No.: US 12,442,573 B2
(45) Date of Patent: Oct. 14, 2025

(54) AIR CONDITIONING SYSTEM AND CONTROL METHOD THEREOF

(71) Applicant: QINGDAO HISENSE HITACHI AIR-CONDITIONING SYSTEMS CO., LTD., Shandong (CN)

(72) Inventors: Peng Yan, Shandong (CN); Min Zhou, Shandong (CN); Yang Sun, Shandong (CN); Fei Han, Shandong (CN)

(73) Assignee: QINGDAO HISENSE HITACHI AIR-CONDITIONING SYSTEMS CO., LTD., Qingdao (CN)

( * ) Notice: Subject to any disclaimer, the term of this patent is extended or adjusted under 35 U.S.C. 154(b) by 146 days.

(21) Appl. No.: 18/405,707

(22) Filed: Jan. 5, 2024

(65) Prior Publication Data

US 2024/0151441 A1 May 9, 2024

Related U.S. Application Data

(63) Continuation of application No. PCT/CN2021/140321, filed on Dec. 22, 2021.

(30) Foreign Application Priority Data

Aug. 3, 2021 (CN) .......................... 202110887207.5

(51) Int. Cl.
*F25B 41/31* (2021.01)
*F24F 1/0059* (2019.01)
(Continued)

(52) U.S. Cl.
CPC ............ *F25B 41/31* (2021.01); *F24F 1/0059* (2013.01); *F25B 40/02* (2013.01); *F25B 49/02* (2013.01); *F25B 2600/2513* (2013.01)

(58) Field of Classification Search
CPC ......... F24F 1/0059; F25B 41/31; F25B 40/02; F25B 49/02; F25B 2600/2513
See application file for complete search history.

(56) References Cited

U.S. PATENT DOCUMENTS

2014/0208787 A1   7/2014 Furui et al.

FOREIGN PATENT DOCUMENTS

| CN | 101936600 A | 1/2011 |
| CN | 103765124 A | 4/2014 |

(Continued)

OTHER PUBLICATIONS

International Search Report and Written Opinion dated Apr. 26, 2022 in corresponding International Application No. PCT/CN2021/140321, translated, 21 pages.

(Continued)

*Primary Examiner* — Nael N Babaa
(74) *Attorney, Agent, or Firm* — MH2 TECHNOLOGY LAW GROUP LLP

(57) ABSTRACT

An air conditioning system includes an outdoor unit and an indoor unit. The outdoor unit includes a compressor, an outdoor heat exchanger, a first expansion valve, a third expansion valve, and a subcooling heat exchanger. The indoor unit includes an indoor heat exchanger and a second expansion valve. In a cooling mode, the outdoor unit is configured to adjust an opening degree of the first expansion valve according to a relationship between a first difference and a first preset value; adjust an opening degree of the second expansion valve according to a relationship between a second difference and a second preset value; and adjust an opening degree of the third expansion valve according to a relationship between a third difference and a third preset value.

20 Claims, 6 Drawing Sheets

(51) Int. Cl.
F25B 40/02 (2006.01)
F25B 49/02 (2006.01)

(56) References Cited

FOREIGN PATENT DOCUMENTS

| | | |
|---|---|---|
| CN | 104748429 A | 7/2015 |
| CN | 106382777 A | 2/2017 |
| CN | 107806715 A | 3/2018 |
| CN | 110645726 A | 1/2020 |
| CN | 111550943 A | 8/2020 |
| CN | 112113364 A | 12/2020 |
| CN | 212481774 U | 2/2021 |
| CN | 112594956 A | 4/2021 |
| CN | 213841111 U | 7/2021 |
| CN | 113739275 A | 12/2021 |
| JP | 2006258343 A | 9/2006 |
| JP | 2009228979 A | 10/2009 |
| KR | 100728341 B1 | 6/2007 |

OTHER PUBLICATIONS

Chinese First Office Action dated Jun. 1, 2022 in corresponding Chinese Application No. 202110887207.5, translated, 14 pages.
Chinese Notification to Grant Patent Right for Invention dated Nov. 22, 2022 in corresponding Chinese Application No. 202110887207.5, translated, 7 pages.

AIR CONDITIONING SYSTEM AND CONTROL METHOD THEREOF

CROSS-REFERENCE TO RELATED APPLICATIONS

This application is a continuation application of International Patent Application No. PCT/CN2021/140321, filed on Dec. 22, 2021, which claims priority to Chinese Patent Application No. 202110887207.5, filed on Aug. 3, 2021, which are incorporated herein by reference in their entireties.

TECHNICAL FIELD

The present disclosure relates to the technical field of air conditioning, and in particular, to an air conditioning system and a control method thereof.

BACKGROUND

An air conditioning system performs a cooling or heating cycle by using a compressor, a condenser, an expansion valve, and an evaporator. The cooling or heating cycle includes a series of processes, involving compression, condensation, expansion, and evaporation. The cooling or heating cycle of the air conditioning system is inseparable from a refrigerant. The refrigerant releases heat when condensing and liquefying and absorbs heat when evaporating and gasifying, so as to implement the exchange and transfer of heat.

SUMMARY

In an aspect, an air conditioning system is provided. The air conditioning system includes an outdoor unit and at least one indoor unit. The outdoor unit includes a compressor, an outdoor heat exchanger, a first expansion valve, and a refrigerant phase change device. The refrigerant phase change device includes a third expansion valve and a subcooling heat exchanger. The subcooling heat exchanger has a main path and an auxiliary path. The subcooling heat exchanger is connected to the first expansion valve and the outdoor heat exchanger and located between the first expansion valve and the outdoor heat exchanger. Both ends of the third expansion valve are connected to the first expansion valve and the subcooling heat exchanger. An indoor unit includes an indoor heat exchanger and a second expansion valve. The second expansion valve is connected to the indoor heat exchanger and the first expansion valve and located between the indoor heat exchanger and the first expansion valve. In a cooling mode, the outdoor unit is configured to: adjust an opening degree of the first expansion valve according to a relationship between a first difference and a first preset value, so as to make the first difference satisfy the first preset value, wherein the first difference is a difference between a current subcooling degree of the main path of the subcooling heat exchanger and a target subcooling degree of the main path of the subcooling heat exchanger; adjust an opening degree of the second expansion valve according to a relationship between a second difference and a second preset value, so as to make the second difference satisfy the second preset value, wherein the second difference is a difference between a current superheat degree of the indoor heat exchanger and a target superheat degree of the indoor heat exchanger; and adjust an opening degree of the third expansion valve according to a relationship between a third difference and a third preset value, so as to make the third difference satisfy the third preset value, wherein the third difference is a difference between a current superheat degree of discharge of the compressor and a target superheat degree of the discharge of the compressor.

In another aspect, a control method of an air conditioning system is provided. The air conditioning system includes an outdoor unit and at least one indoor unit. The outdoor unit includes a compressor, an outdoor heat exchanger, a first expansion valve, and a refrigerant phase change device. The refrigerant phase change device includes a third expansion valve and a subcooling heat exchanger. The subcooling heat exchanger has a main path and an auxiliary path. The subcooling heat exchanger is connected to the first expansion valve and the outdoor heat exchanger and located between the first expansion valve and the outdoor heat exchanger. Both ends of the third expansion valve are connected to the first expansion valve and the subcooling heat exchanger. The indoor unit includes an indoor heat exchanger and a second expansion valve. The second expansion valve is connected to the indoor heat exchanger and the first expansion valve and located between the indoor heat exchanger and the first expansion valve. The air conditioning system further includes a controller. The controller is coupled to the first expansion valve, the second expansion valve, and the third expansion valve and is configured to adjust an opening degree of at least one of the first expansion valve, the second expansion valve, and the third expansion valve. In a cooling mode, the control method includes: adjusting an opening degree of the first expansion valve according to a relationship between a first difference and a first preset value, so as to make the first difference satisfy the first preset value, wherein the first difference is a difference between a current subcooling degree of the main path of the subcooling heat exchanger and a target subcooling degree of the main path of the subcooling heat exchanger; adjusting an opening degree of the second expansion valve according to a relationship between a second difference and a second preset value, so as to make the second difference satisfy the second preset value, wherein the second difference is a difference between a current superheat degree of the indoor heat exchanger and a target superheat degree of the indoor heat exchanger; and adjusting an opening degree of the third expansion valve according to a relationship between a third difference and a third preset value, so as to make the third difference satisfy the third preset value, wherein the third difference is a difference between a current superheat degree of discharge of the compressor and a target superheat degree of the discharge of the compressor. In a heating mode, the control method includes: adjusting the opening degree of the first expansion valve according to a relationship between a fourth difference and a fourth preset value, so as to make the fourth difference satisfy the fourth preset value, wherein the fourth difference is a difference between a current superheat degree of the outdoor heat exchanger and a target superheat degree of the outdoor heat exchanger; and adjusting the opening degree of the second expansion valve according to a relationship between a fifth difference and a fifth preset value, so as to make the fifth difference satisfy the fifth preset value; wherein the fifth difference is a difference between a current subcooling degree of the indoor heat exchanger and a target subcooling degree of the indoor heat exchanger.

DETAILED DESCRIPTION

Figure 1:
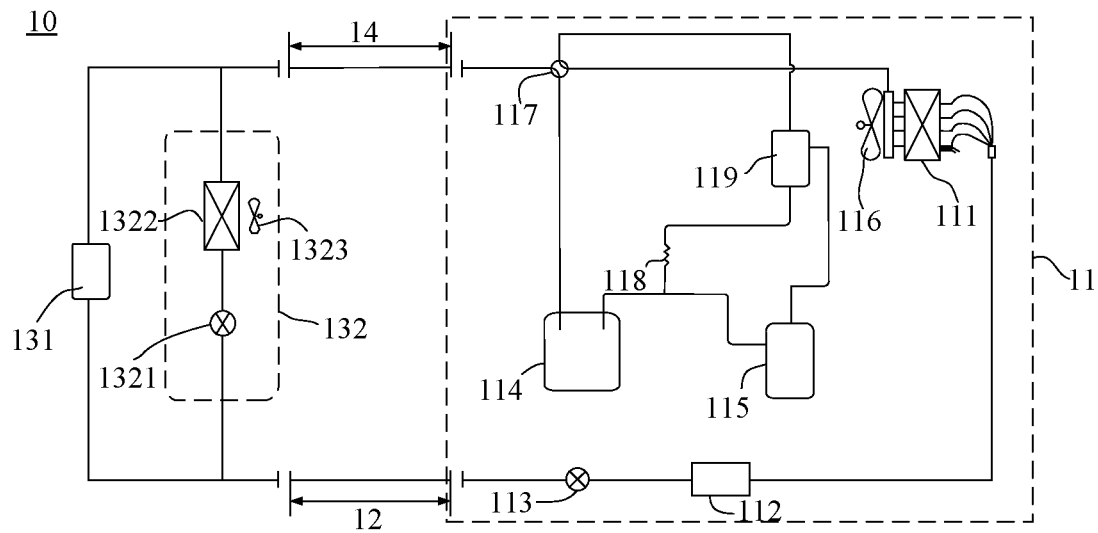
FIG. 1 is a structural diagram of an air conditioning system, in accordance with some embodiments.

Some embodiments of the present disclosure will be described clearly and completely with reference to the accompanying drawings below. However, the described embodiments are merely some, but not all of, embodiments of the present disclosure. All other embodiments obtained by a person of ordinary skill in the art based on embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only and cannot be construed as indicating or implying the relative importance or implicitly indicating the number of indicated technical features. Therefore, features defined with "first" and "second" may explicitly or implicitly include one or more of the features. In the description of the embodiments of the present disclosure, the terms "multiple," "a plurality of," or "the plurality of" mean two or more unless otherwise specified.

In the description of some embodiments, the expressions "coupled" and "connected" and derivatives thereof may be used. The term "connected" should be understood in a broad sense. For example, the term "connected" may represent a fixed connection, a detachable connection, or connected as an integral body; and the term "connected" may be directly "connected" or indirectly "connected" through an intermediate medium. The term "coupled" may be, for example, used to indicate that two or more components are in direct physical or electrical contact with each other. The terms "coupled" or "communicatively coupled", however, may also mean that two or more components are not in direct contact with each other, but still cooperate or interact with each other. The embodiments disclosed herein are not necessarily limited to the content herein.

The phrase "A and/or B" includes following three combinations: only A, only B, and a combination of A and B.

The use of the phrase "applicable to" or "configured to" herein indicates an open and inclusive expression, which does not exclude devices that are applicable to or configured to perform additional tasks or steps.

In addition, the use of the phrase "based on" is meant to be open and inclusive, since a process, step, calculation, or other action that is "based on" one or more of the stated conditions or values may, in practice, be based on additional conditions or values exceeding those stated.

After an indoor unit and an outdoor unit of an air conditioning system are installed, the installer usually calculates the amount of refrigerant that needs to be added to the air conditioning system according to a length and a diameter of a pipe connected between the indoor unit and the outdoor unit. Therefore, as the length and the diameter of the pipe increase, the amount of refrigerant added to the air conditioning system also increases.

In some embodiments, during the operation of the air conditioning system, temperature and pressure of the refrigerant are controlled, so that the refrigerant in the liquid pipe may be kept as a gas-liquid mixed two-phase refrigerant. It can be understood that a density of the gas-liquid two-phase refrigerant is lower than a density of a liquid refrigerant. Therefore, in a case where the refrigerant in the liquid pipe remains in the gas-liquid two-phase state, a quality of the refrigerant circulating in the refrigerant circuit of the air conditioning system may be reduced, thereby reducing the amount of refrigerant added to the air conditioning system.

However, in a case where the air conditioning system operates in the heating mode, the gas-liquid two-phase refrigerant flows from the indoor unit into the liquid pipe and enters an outdoor heat exchanger of the outdoor unit through the liquid pipe. In this case, since the dryness of the gas-liquid two-phase refrigerant is relatively high, the gas-liquid two-phase refrigerant will be unevenly distributed when entering the outdoor heat exchanger. As a result, it may lead to a reduction in a heat exchange capacity of the outdoor heat exchanger, thereby resulting in a reduction in the heating effect of the air conditioning system.

In light of this, some embodiments of the present disclosure provide an air conditioning system. FIG. 1 is a structural diagram of an air conditioning system in accordance with some embodiments. As shown in FIG. 1, the air conditioning system 10 includes an outdoor unit 11, a liquid pipe 12, at least one indoor unit and an air pipe 14. The outdoor unit 11 and the at least one indoor unit are connected by the liquid pipe 12, and the liquid pipe 12 is configured to convey a gas-liquid two-phase refrigerant. The outdoor unit 11 and the at least one indoor unit are connected by the air pipe 14, and the air pipe 14 is configured to convey a gaseous refrigerant.

In some embodiments, the outdoor unit 11 includes an outdoor heat exchanger 111, a refrigerant phase change device 112, and a first expansion valve 113. The at least one indoor unit is connected to the first expansion valve 113 of the outdoor unit 11 through the liquid pipe 12. The first expansion valve 113 is configured to decompress a refrigerant flowing through the first expansion valve 113.

The first expansion valve 113 is connected to the refrigerant phase change device 112, and the refrigerant phase change device 112 is connected to the outdoor heat exchanger 111. The refrigerant phase change device 112 is configured to change a phase state of the refrigerant and convey the refrigerant with the changed phase state to the outdoor heat exchanger 111. The outdoor heat exchanger 111 is configured to perform heat-exchange between outdoor air and the refrigerant conveyed in the outdoor heat exchanger 111, so as to change the temperature of the refrigerant.

For example, the refrigerant phase change device 112 may change the gas-liquid two-phase refrigerant to a liquid refrigerant and output the liquid refrigerant to the outdoor heat exchanger 111.

In some embodiments, the outdoor unit 11 further includes an outdoor fan 116. The outdoor heat exchanger 111 is located in an air outlet direction of the outdoor fan 116. The outdoor fan 116 is configured to promote heat exchange between the refrigerant flowing in the outdoor heat exchanger 111 and the outdoor air.

In some embodiments, the outdoor unit 11 further includes a gas-liquid separator 114, a compressor 115, a four-way valve 117, a pressure reducer 118, and an oil separator 119.

The four-way valve 117 is connected to the gas-liquid separator 114, the air pipe 14, the oil separator 119, and the outdoor heat exchanger 111. For example, the four-way valve 117 may be switchable between a first state and a second state. In a case where the four-way valve 117 is switched to the first state, a refrigerant flow path between the gas-liquid separator 114 and the outdoor heat exchanger 111 is turned on, and a refrigerant flow path between the oil separator 119 and the air pipe 14 is turned on. In a case where the four-way valve 117 is switched to the second state, a refrigerant flow path between the gas-liquid separator 114 and the air pipe 14 is turned on, and a refrigerant flow path between the oil separator 119 and the outdoor heat exchanger 111 is turned on.

The gas-liquid separator 114 is connected to an inlet of the compressor 115. The compressor 115 is configured to compress the refrigerant with low-temperature and low-pressure into the refrigerant with high-temperature and high-pressure.

The oil separator 119 is connected to the inlet of the compressor 115 through the pressure reducer 118, and the oil separator 119 is further connected to an outlet of the compressor 115. The oil separator 119 is configured to separate lubricating oil from the refrigerant and convey the separated lubricating oil to the compressor 115 through the pressure reducer 118 for reuse. The pressure reducer 118 is configured to assist the lubricating oil in backflow to the compressor 115.

In some embodiments, as shown in FIG. 1, the at least one indoor unit includes an indoor unit 131 and an indoor unit 132. It will be noted that only an example where the at least one indoor unit includes the indoor unit 131 and the indoor unit 132 is taken in some embodiments of the present disclosure. In practical applications, the at least one indoor unit may include more or less indoor units, which is not limited in the present disclosure.

For ease of description, the embodiments of the present disclosure will be described by considering the indoor unit 132 as an example below.

In some embodiments, the indoor unit 132 includes a second expansion valve 1321, an indoor heat exchanger 1322, and an indoor fan 1323.

The indoor heat exchanger 1322 is connected to the air pipe 14 and the second expansion valve 1321, and the second expansion valve 1321 is further connected to the liquid pipe 12. The indoor heat exchanger 1322 is configured to perform heat-exchange between indoor air and the refrigerant conveyed in the indoor heat exchanger 1322, so as to change the temperature of the refrigerant. The indoor heat exchanger 1322 is located in an air outlet direction of the indoor fan 1323. The indoor fan 1323 is configured to promote heat exchange between the refrigerant flowing in the indoor heat exchanger 1322 and the indoor air.

The working process of the indoor unit 132 and the outdoor unit 11 in a case where the air conditioning system 10 operates in the heating mode will be described in detail below with reference to FIG. 1.

In a case where the air conditioning system 10 operates in the heating mode, the compressor 115 operates to compress a gaseous refrigerant with low-temperature and low-pressure entering the compressor 115 from the inlet of the compressor 115 into a gaseous refrigerant with high-temperature and high-pressure. Then, the gaseous refrigerant with high-temperature and high-pressure flows out from the outlet of the compressor 115 and enters the oil separator 119. The oil separator 119 may separate the lubricating oil from the gaseous refrigerant with high-temperature and high-pressure and convey the separated lubricating oil back to the compressor 115 through the pressure reducer 118, so as to reuse the lubricating oil. In this case, the four-way valve 117 is in the first state, and the gaseous refrigerant with high-temperature and high-pressure flowing out of the oil separator 119 flows to the air pipe 14 through the four-way valve 117, and then flows to the indoor heat exchanger 1322 of the indoor unit 132 through the air pipe 14.

The indoor heat exchanger 1322 may promote the heat exchange between the gaseous refrigerant with high-temperature and high-pressure and the indoor air, so as to increase the temperature of the indoor air. In this case, the gaseous refrigerant with high-temperature and high-pressure exchanges heat with the indoor air in the indoor heat exchanger 1322 and is condensed to a subcooled liquid refrigerant with medium-temperature and high-pressure. Then, the subcooled liquid refrigerant with medium-temperature and high-pressure is conveyed to the second expansion valve 1321 by the indoor heat exchanger 1322.

The second expansion valve 1321 of the indoor unit 132 processes the subcooled liquid refrigerant with medium-temperature and high-pressure to obtain a gas-liquid two-phase refrigerant with medium-temperature and high-pressure and conveys the gas-liquid two-phase refrigerant with medium-temperature and high-pressure to the outdoor unit 11 through the liquid pipe 12.

After receiving the gas-liquid two-phase refrigerant with medium-temperature and high-pressure, the first expansion valve 113 of the outdoor unit 11 decompresses the gas-liquid two-phase refrigerant with medium-temperature and high-pressure to obtain a gas-liquid two-phase refrigerant with medium-temperature and medium-pressure. Then, the first expansion valve 113 conveys the gas-liquid two-phase refrigerant with medium-temperature and medium-pressure to the refrigerant phase change device 112.

The refrigerant phase change device 112 may change the gas-liquid two-phase refrigerant with medium-temperature and medium-pressure to a liquid refrigerant with medium-temperature and medium-pressure and convey the liquid refrigerant with medium-temperature and medium-pressure to the outdoor heat exchanger 111.

Correspondingly, the outdoor heat exchanger 111 may promote the heat exchange between the liquid refrigerant with medium-temperature and medium-pressure and the outdoor air, so as to make the liquid refrigerant with medium-temperature and medium-pressure throttled and evaporate to a superheated gaseous refrigerant with low-temperature and low-pressure. Then, the outdoor heat exchanger 111 conveys the superheated gaseous refrigerant with low-temperature and low-pressure to the inlet of the compressor 115 through the four-way valve 117 and the gas-liquid separator 114.

It can be understood that in the air conditioning system 10 in some embodiments of the present disclosure, the refrigerant phase change device 112 is provided between the liquid pipe 12 and the outdoor heat exchanger 111. In this way, in a case where the air conditioning system 10 operates in the heating mode, a phase change treatment may be performed on the gas-liquid two-phase refrigerant to obtain a liquid refrigerant. Therefore, the refrigerant entering the outdoor heat exchanger 111 is a liquid refrigerant. Since the dryness of the liquid refrigerant is relatively low, the liquid refrigerant may be evenly distributed in the outdoor heat exchanger 111, so that the heat exchange and evaporation efficiency of the outdoor heat exchanger 111 may be improved, which is conducive to improving the heating effect of the air conditioning system 10.

Figure 2:
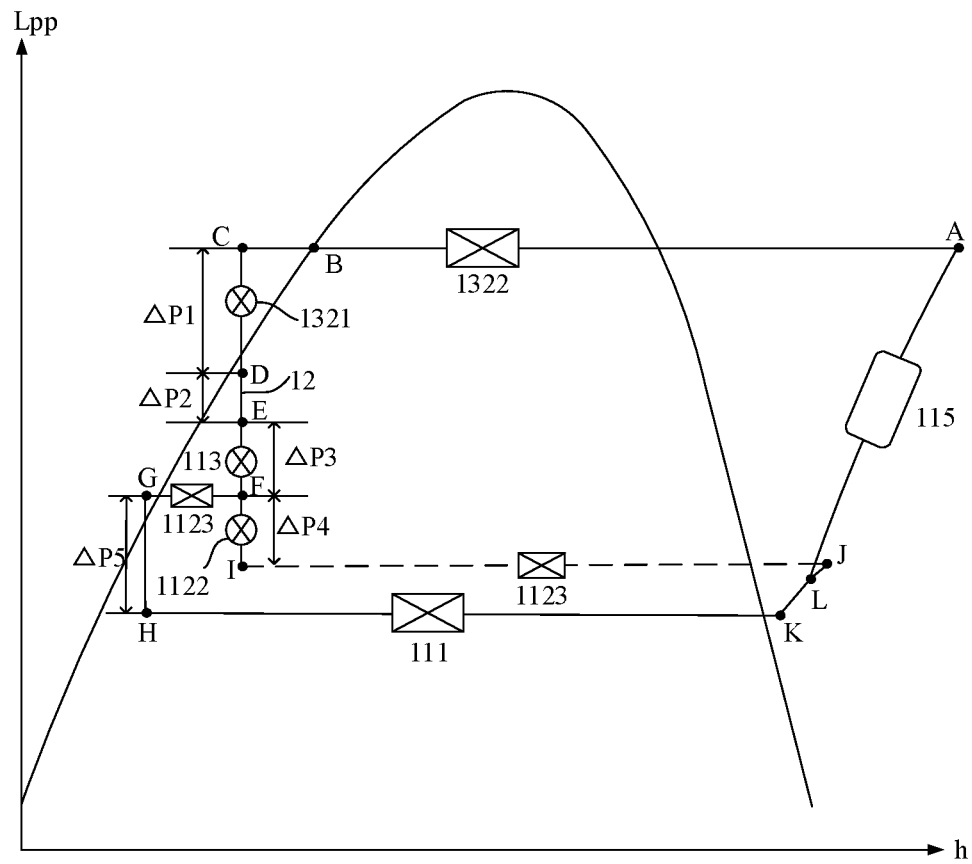
FIG. 2 is a pressure-enthalpy diagram of an air conditioning system operating in a heating mode, in accordance with some embodiments.

FIG. 2 is a pressure-enthalpy diagram of an air conditioning system operating in a heating mode in accordance with some embodiments.

In some embodiments, as shown in FIG. 2, in the case where the air conditioning system 10 operates in the heating mode, when the refrigerant flows to the outlet of the compressor 115, a state point corresponding to the refrigerant is point A, that is, the refrigerant is a gaseous refrigerant with high-temperature and high-pressure. After the refrigerant is condensed in the indoor heat exchanger 1322, the state point corresponding to the refrigerant is changed from point A to point B (i.e., a gaseous refrigerant with medium-temperature and high-pressure), and then to point C (i.e., the subcooled liquid refrigerant with medium-temperature and high-pressure). After the refrigerant passes through the second expansion valve 1321, the pressure of the refrigerant drops by $\Delta P1$, and the state point corresponding to the refrigerant is changed from point C to point D. It can be understood that in a case where the state point corresponding to the refrigerant is point D, the density of the refrigerant decreases, and the refrigerant is the gas-liquid two-phase refrigerant.

After the refrigerant passes through the liquid pipe 12, the state point corresponding to the refrigerant is changed from point D to point E, the pressure corresponding to the refrigerant drops by $\Delta P2$, and the phase state of the refrigerant remains unchanged. After the refrigerant passes through the first expansion valve 113, the state point corresponding to the refrigerant is changed from point E to point F, and the pressure corresponding to the refrigerant drops by $\Delta P3$, that is, the refrigerant is decomposed into the gas-liquid two-phase refrigerant with medium-temperature and medium-pressure.

Then, after the refrigerant with medium-temperature and medium-pressure passes through the subcooling heat exchanger 1123, the state point corresponding to the refrigerant is changed from point F to point G. It can be understood that, in a process of the state point corresponding to the refrigerant changing from point F to point G, the dryness of the refrigerant decreases, and the refrigerant is changed to a liquid refrigerant. After the liquid refrigerant passes through a pressure reducer of the outdoor heat exchanger 111, the pressure corresponding to the refrigerant drops by $\Delta P5$, and the state point corresponding to the refrigerant is changed from point G to point H. The refrigerant absorbs heat and evaporates in the outdoor heat exchanger 111, and the state point corresponding to the refrigerant is changed from point H to point K; that is, the refrigerant is changed from the liquid refrigerant to a gaseous refrigerant with low-temperature and low-pressure. The gaseous refrigerant with low-temperature and low-pressure continues to flow in the refrigerant circuit, so as to enter a next heating cycle.

The working process of the indoor unit 132 and the outdoor unit 11 in a case where the air conditioning system 10 operates in the cooling mode will be described in detail below with reference to FIG. 1.

In a case where the air conditioning system 10 operates in the cooling mode, the compressor 115 operates to compress a gaseous refrigerant with low-temperature and low-pressure entering the compressor 115 from the inlet of the compressor 115 into a gaseous refrigerant with high-temperature and high-pressure. Then, the gaseous refrigerant with high-temperature and high-pressure flows out from the outlet of the compressor 115 and enters the oil separator 119. The oil separator 119 may separate the lubricating oil from the gaseous refrigerant with high-temperature and high-pressure and convey the separated lubricating oil back to the compressor 115 through the pressure reducer 118, so as to reuse the lubricating oil. In this case, the four-way valve 117 is in the second state, and the gaseous refrigerant with high-temperature and high-pressure flowing out of the oil separator 119 flows to the outdoor heat exchanger 111 through the four-way valve 117.

The outdoor heat exchanger 111 may promote the heat exchange between the gaseous refrigerant with high-temperature and high-pressure and the outdoor air, so that the gaseous refrigerant with high-temperature and high-pressure is condensed and changed to a gas-liquid two-phase refrigerant with medium-temperature and high-pressure. Then, the outdoor heat exchanger 111 conveys the gas-liquid two-phase refrigerant with medium-temperature and high-pressure to the refrigerant phase change device 112.

The refrigerant phase change device 112 changes the gas-liquid two-phase refrigerant with medium-temperature and high-pressure to a subcooled liquid refrigerant with medium-temperature and high-pressure and conveys the liquid refrigerant with medium-temperature and high-pressure to the first expansion valve 113.

The first expansion valve 113 decompresses the liquid refrigerant with medium-temperature and high-pressure to obtain a gas-liquid two-phase refrigerant with medium-temperature and medium-pressure and conveys the gas-liquid two-phase refrigerant with medium-temperature and medium-pressure to the second expansion valve 1321 of the indoor unit 132 through the liquid pipe 12.

The second expansion valve 1321 throttles the gas-liquid two-phase refrigerant with medium-temperature and medium-pressure to obtain a gas-liquid two-phase refrigerant with low-temperature and low-pressure and conveys the gas-liquid two-phase refrigerant with low-temperature and low-pressure to the indoor heat exchanger 1322.

The indoor heat exchanger 1322 may promote the heat exchange between the gas-liquid two-phase refrigerant with low-temperature and low-pressure and the indoor air, so as to reduce the temperature of the indoor air and implement a purpose of cooling. In a process of the heat exchange between the gas-liquid two-phase refrigerant with low-temperature and low-pressure and the indoor air, the refrigerant heats up and evaporates to change to a superheated gaseous refrigerant with low-temperature and low-pressure. Then, the indoor heat exchanger 1322 conveys the gaseous refrigerant with low-temperature and low-pressure to the inlet of the compressor 115 through the air pipe 14, the four-way valve 117, and the gas-liquid separator 114.

Figure 3:
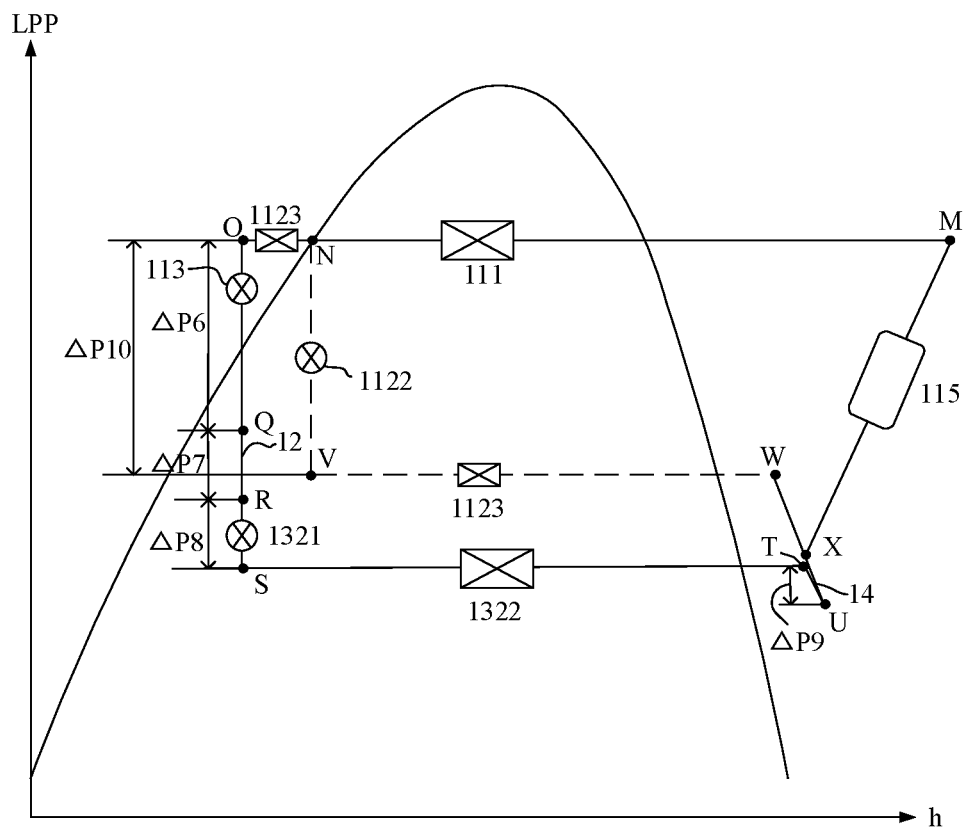
FIG. 3 is a pressure-enthalpy diagram of an air conditioning system operating in a cooling mode, in accordance with some embodiments.

FIG. 3 is a pressure-enthalpy diagram of an air conditioning system operating in a cooling mode in accordance with some embodiments.

In some embodiments, as shown in FIG. 3, in the case where the air conditioning system 10 operates in the cooling mode, when the refrigerant flows to the outlet of the compressor 115, a state point corresponding to the refrigerant is point M, that is, the refrigerant is a gaseous refrigerant with high-temperature and high-pressure. After the refrigerant is condensed in the outdoor heat exchanger 111, the state point corresponding to the refrigerant is changed from point M to point N (i.e., a gaseous refrigerant with medium-temperature and high-pressure).

After the refrigerant passes through the refrigerant subcooling heat exchanger 1123, the state point corresponding to the refrigerant is changed from point N to point O. In a case where the state point corresponding to the refrigerant is point O, the refrigerant is a liquid refrigerant with medium-temperature and high-pressure. After the refrigerant passes through the first expansion valve 113, the pressure corresponding to the refrigerant drops by $\Delta P6$, and the state point corresponding to the refrigerant is changed from point O to point Q, that is, the refrigerant is a gas-liquid two-phase refrigerant with medium-temperature and medium-pressure.

After the refrigerant passes through the liquid pipe 12, the state point corresponding to the refrigerant is changed from point Q to point R, the pressure corresponding to the refrigerant drops by $\Delta P7$, and the phase state of the refrigerant remains unchanged. That is, the refrigerant in the liquid pipe 12 is in a gas-liquid two-phase state. It can be understood that the density of the gas-liquid two-phase refrigerant is lower than that of the liquid refrigerant. Therefore, the amount of refrigerant added in the refrigerant circuit may be reduced.

After the refrigerant passes through the second expansion valve 1321, the pressure corresponding to the refrigerant drops by $\Delta P8$, and the state point corresponding to the refrigerant is changed from point R to point S. That is, the refrigerant is changed to a gas-liquid two-phase refrigerant with low-temperature and low-pressure. Then, the refrigerant evaporates after exchanging heat with the indoor air in the indoor heat exchanger 1322, and the state point corresponding to the refrigerant is changed from point S to point T (i.e., a gaseous refrigerant with low-temperature and low-pressure). After the refrigerant passes through the air pipe 14, the pressure corresponding to the refrigerant drops by $\Delta P9$, and the state point corresponding to the refrigerant is changed from point T to point U. Finally, the gaseous refrigerant with low-temperature and low-pressure enters the compressor 115 and is compressed into a gaseous refrigerant with high-temperature and high-pressure, so as to enter a next cooling cycle.

Figure 4:
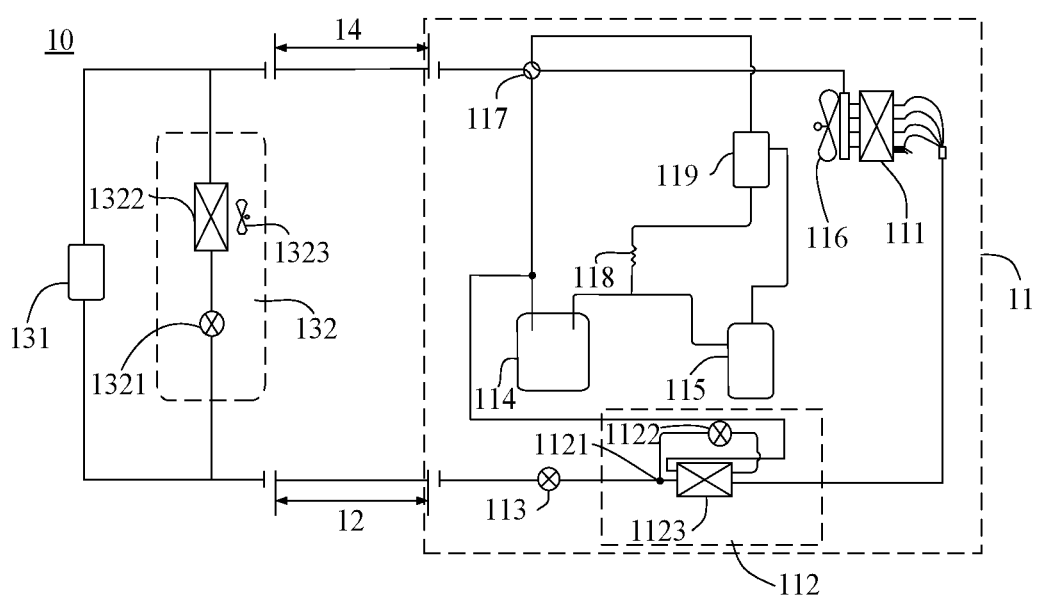
FIG. 4 is a structural diagram of another air conditioning system, in accordance with some embodiments.

FIG. 4 is a structural diagram of another air conditioning system in accordance with some embodiments.

In some embodiments, as shown in FIG. 4, the refrigerant phase change device 112 includes a three-way pipe 1121, a third expansion valve 1122, and a subcooling heat exchanger 1123.

The three-way pipe 1121 is connected to the first expansion valve 113, the third expansion valve 1122, and the subcooling heat exchanger 1123. The subcooling heat exchanger 1123 is further connected to the outdoor heat exchanger 111. The third expansion valve 1122 is configured to decompress the gas-liquid two-phase refrigerant flowing through the third expansion valve 1122. The subcooling heat exchanger 1123 is configured to perform the heat exchange between the refrigerant from the first expansion valve 113 and the refrigerant from the third expansion valve 1122, so as to obtain a liquid refrigerant.

Hereinafter, a working principle of the refrigerant phase change device 112 in a case where the air conditioning system 10 operates in the heating mode will be described in detail with reference to FIG. 4.

In a case where the air conditioning system 10 operates in the heating mode, after being decompressed by the first expansion valve 113, the gas-liquid two-phase refrigerant in a first temperature-pressure state enters the third expansion valve 1122. The third expansion valve 1122 cools down and decompresses the gas-liquid two-phase refrigerant in the first temperature-pressure state, so as to obtain a gas-liquid two-phase refrigerant in a second temperature-pressure state.

It will be noted that the first temperature-pressure state refers to a state of the gas-liquid two-phase refrigerant after being decompressed by the first expansion valve 113, that is, the first temperature-pressure state is the above medium-temperature and medium-pressure state. The refrigerant in the second temperature-pressure state has a lower temperature and a lower pressure than the refrigerant in the first temperature-pressure state. For example, the second temperature-pressure state is the above low-temperature and low-pressure state.

Then, the third expansion valve 1122 conveys the obtained gas-liquid two-phase refrigerant in the second temperature-pressure state to the subcooling heat exchanger 1123. The subcooling heat exchanger 1123 receives the gas-liquid two-phase refrigerant in the second temperature-pressure state from the third expansion valve 1122 and receives the gas-liquid two-phase refrigerant in the first temperature-pressure state from the first expansion valve 113 through the three-way pipe 1121. In this way, the gas-liquid two-phase refrigerant in the first temperature-pressure state may exchange heat with the gas-liquid two-phase refrigerant in the second temperature-pressure state through the subcooling heat exchanger 1123, thereby becoming a liquid refrigerant in the first temperature-pressure state.

Then, the subcooling heat exchanger 1123 conveys the obtained liquid refrigerant in the first temperature-pressure state to the outdoor heat exchanger 111, so as to perform a subsequent heating cycle.

In some embodiments, as shown in FIG. 4, the subcooling heat exchanger 1123 is further connected to the gas-liquid separator 114. In this case, the subcooling heat exchanger 1123 is further configured to perform heat exchange between the gas-liquid two-phase refrigerant in the second temperature-pressure state and the gas-liquid two-phase refrigerant in the first temperature-pressure state, so as to change the gas-liquid two-phase refrigerant in the second temperature-pressure state to a gaseous refrigerant in the second temperature-pressure state, and convey the gaseous refrigerant in the second temperature-pressure state to the gas-liquid separator 114. The gaseous refrigerant in the second temperature-pressure state may directly enter the compressor 115 after passing through the gas-liquid separator 114, so as to participate in the subsequent heating cycle.

Hereinafter, a working process of the subcooling heat exchanger 1123 in the heating mode will be described in detail with reference to FIGS. 2 and 4.

In some embodiments, as shown in FIGS. 2 and 4, the two-phase refrigerant flowing out of the first expansion valve 113 passes through the three-way pipe 1121 and then is divided into two paths, and the two paths include a main path and an auxiliary path (i.e., two paths of refrigerants enter the main path and the auxiliary path of the subcooling heat exchanger 1123 respectively). The refrigerant entering the main path flows to the subcooling heat exchanger 1123, and the refrigerant entering the auxiliary path flows to the third expansion valve 1122.

After the refrigerant with medium-temperature and medium-pressure in the auxiliary path passes through the third expansion valve 1122, the pressure corresponding to the refrigerant drops by $\Delta P4$, and the state point corresponding to the refrigerant is changed from point F to point I. The refrigerant in the auxiliary path exchanges heat with the refrigerant in the main path in the subcooling heat exchanger 1123, so that the state point corresponding to the refrigerant in the auxiliary path is changed from point I to point J. Simultaneously, the refrigerant in the main path is changed from state point F to state point G in the subcooling heat exchanger 1123.

Then, after passing through the outdoor heat exchanger 111, the refrigerant in the main path is changed from state point H to state point K (i.e., the refrigerant is changed to a gaseous refrigerant with low-temperature and low-pressure) and is mixed with the refrigerant in the auxiliary path (the state point corresponding to the refrigerant is point J) in the gas-liquid separator 114. The state point corresponding to the mixed refrigerant is point L. Furthermore, after the refrigerant with state point L enters the compressor 115, the refrigerant is compressed by the compressor 115, and the state point corresponding to the refrigerant is changed from point L to point A, so that the refrigerant may participate in the subsequent heating cycle.

Hereinafter, a working principle of the refrigerant phase change device 112 in a case where the air conditioning system 10 operates in the cooling mode will be described in detail with reference to FIG. 4.

In some embodiments, as shown in FIG. 4, the gas-liquid two-phase refrigerant with medium-temperature and high-pressure flowing out of the outdoor heat exchanger 111 passes through the subcooling heat exchanger 1123 and then is divided into two paths through the three-way pipe 1121. The two paths include a main path and an auxiliary path (i.e., two paths of refrigerants enter the main path and the auxiliary path of the subcooling heat exchanger 1123 respectively). The refrigerant entering the main path flows to the first expansion valve 113, and the refrigerant entering the auxiliary path flows to the third expansion valve 1122.

After passing through the third expansion valve 1122, the refrigerant with medium-temperature and high-pressure in the auxiliary path is throttled by the third expansion valve 1122 to a gas-liquid two-phase refrigerant with low-temperature and low-pressure and returns to the subcooling heat exchanger 1123 to exchange heat with the gas-liquid two-phase refrigerant with medium-temperature and high-pressure in the main path. In this way, the gas-liquid two-phase refrigerant with low-temperature and low-pressure in the auxiliary path is changed to a superheated gaseous refrigerant with low-temperature and low-pressure and flows to the gas-liquid separator 114. The gas-liquid two-phase refrigerant with medium-temperature and high-pressure in the main path is changed to a subcooled liquid refrigerant with medium-temperature and high-pressure and flows to the first expansion valve 113.

Hereinafter, a working process of the subcooling heat exchanger 1123 in the cooling mode will be described in detail with reference to FIGS. 3 and 4.

In some embodiments, as shown in FIGS. 3 and 4, the refrigerant is divided into two paths after passing through the outdoor heat exchanger 111. After the refrigerant entering the auxiliary path passes through the third expansion valve 1122, the pressure corresponding to the refrigerant drops by $\Delta P10$, and the state point corresponding to the refrigerant is changed from point N to point V (i.e., the refrigerant is changed to a gas-liquid two-phase refrigerant with low-temperature and low-pressure). Then, the refrigerant in the auxiliary path returns to the subcooling heat exchanger 1123 and exchanges heat with the refrigerant in the main path in the subcooling heat exchanger 1123, so that the state point corresponding to the refrigerant in the auxiliary path is changed from point V to point W, and the state point corresponding to the refrigerant in the main path is changed from point N to point O.

Then, the refrigerant in the main path passes through the liquid pipe 12, the second expansion valve 1321, the indoor heat exchanger 1322, and the air pipe 14, and the state point corresponding to the refrigerant is changed from point O to point U. It will be noted that the process of the state point corresponding to the refrigerant in the main path changed from point O to point U may refer to the above embodiments, which will not be repeated here.

Then, the refrigerant in the auxiliary path corresponding to the state point W and the refrigerant in the main path corresponding to the state point U enter the gas-liquid separator 114 and are mixed into a refrigerant corresponding to the state point X in the gas-liquid separator 114. Finally, the refrigerant corresponding to state point X enters the compressor 115 and is compressed by the compressor into a refrigerant corresponding to state point M, so as to enter the subsequent cooling cycle.

It will be noted that some embodiments of the present disclosure do not limit the pressure values or pressure ranges of the above high-pressure refrigerant, medium-pressure refrigerant, and low-pressure refrigerant. It can be understood that the terms such as "high-pressure," "medium-pressure," and "low-pressure" are only used to describe relative pressure values of the refrigerant at different periods or when flowing to different positions in the refrigerant circuit. That is, the pressure value of the high-pressure refrigerant is greater than the pressure value of the medium-pressure refrigerant, and the pressure value of the medium-pressure refrigerant is greater than the pressure value of the low-pressure refrigerant.

Similarly, some embodiments of the present disclosure do not limit the temperature values or temperature ranges of the above high-temperature refrigerant, medium-temperature refrigerant, and low-temperature refrigerant. The terms such as "high-temperature," "medium-temperature," and "low-temperature" are only used to describe the relative temperature values of the refrigerant at different periods or when flowing to different positions in the refrigerant circuit. That is, the temperature value of the high-temperature refrigerant is greater than the temperature value of the medium-temperature refrigerant, and the temperature value of the medium-temperature refrigerant is greater than the temperature value of the low-temperature refrigerant.

Figure 5:
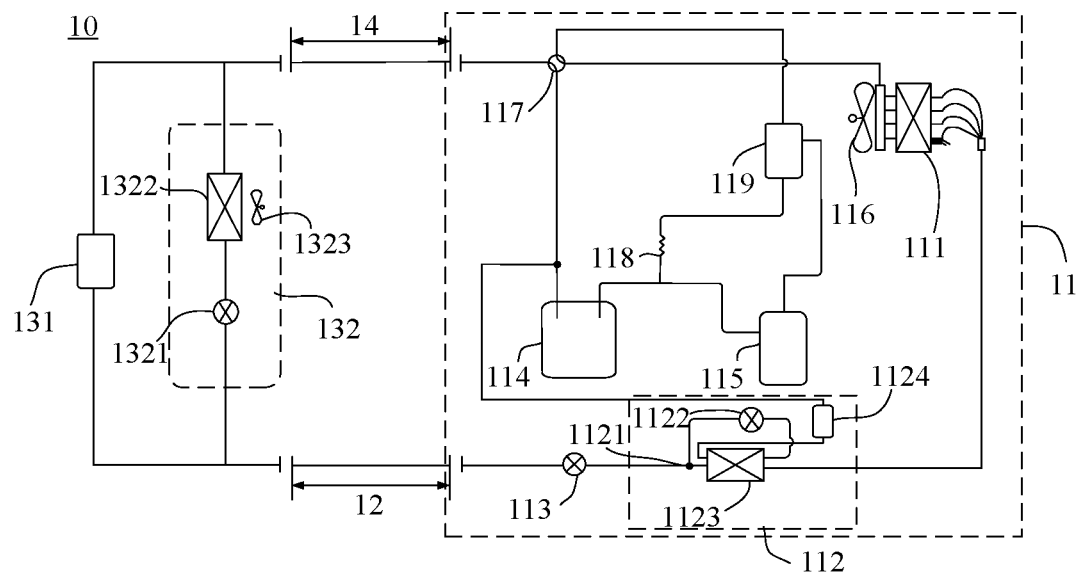
FIG. 5 is a structural diagram of yet another air conditioning system, in accordance with some embodiments.

FIG. 5 is a structural diagram of yet another air conditioning system in accordance with some embodiments.

In some embodiments, as shown in FIG. 5, the refrigerant phase change device 112 further includes an auxiliary heater 1124. The auxiliary heater 1124 is connected to the subcooling heat exchanger 1123 and the gas-liquid separator 114. In this case, the subcooling heat exchanger 1123 is further configured to convey the gaseous refrigerant in the second temperature-pressure state to the gas-liquid separator 114 through the auxiliary heater 1124. The auxiliary heater 1124 is configured to continuously heat the gaseous refrigerant in the second temperature-pressure state flowing through the auxiliary heater 1124, so as to maintain the temperature of the gaseous refrigerant in the second temperature-pressure state.

For example, the auxiliary heater 1124 includes a heating wire, and the heating wire is configured to continuously heat the gaseous refrigerant flowing through the auxiliary heater 1124.

It will be noted that the auxiliary heater 1124 may be applicable to the heating mode of the air conditioning system 10 and may also be applicable to the cooling mode of the air conditioning system 10, which is not limited in the present disclosure.

It can be understood that, in a process of the subcooling heat exchanger 1123 conveying the gaseous refrigerant in the second temperature-pressure state to the gas-liquid separator 114, the temperature of the refrigerant will decrease continuously, and the refrigerant may be liquefied, resulting in that the refrigerant cannot enter the compressor 115 through the gas-liquid separator 114.

Therefore, in some embodiments of the present disclosure, the auxiliary heater 1124 is provided between the subcooling heat exchanger 1123 and the gas-liquid separator 114, and the auxiliary heater 1124 is used to heat the refrigerant from the subcooling heat exchanger 1123 to the gas-liquid separator 114, so that the refrigerant is maintained in the second temperature-pressure state. Thus, the refrigerant may enter the compressor 115 through the gas-liquid separator 114, thereby improving the circulation efficiency of the refrigerant, and further improving the cooling or heating efficiency of the air conditioning system.

Figure 6:
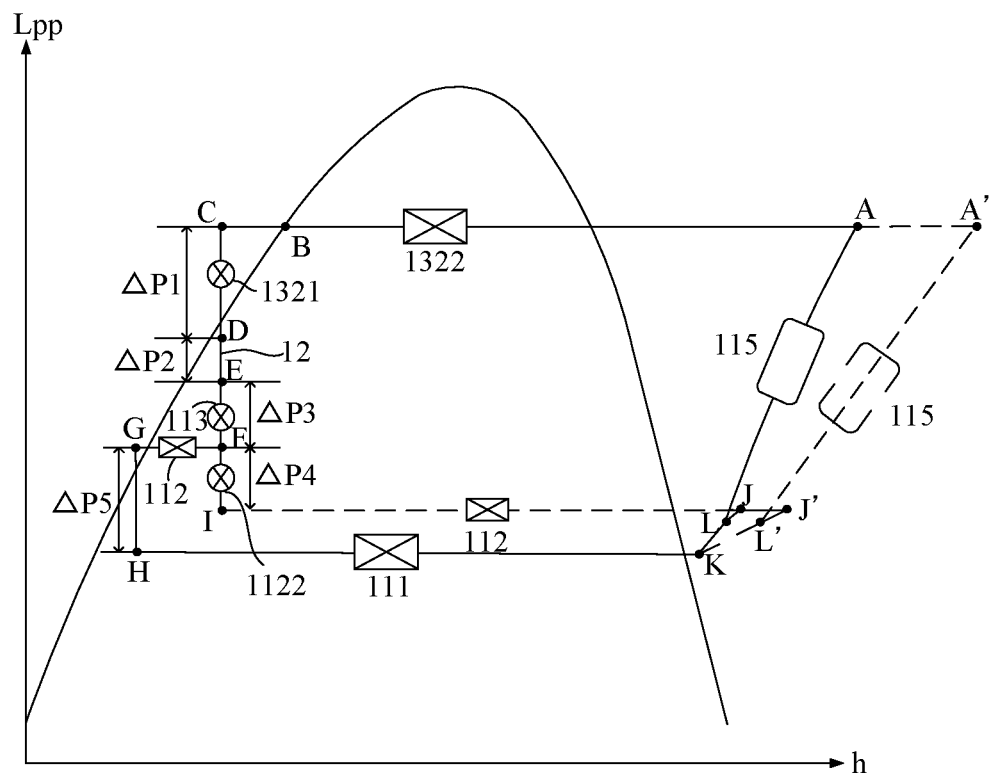
FIG. 6 is a pressure-enthalpy diagram of yet another air conditioning system operating in a heating mode, in accordance with some embodiments.

FIG. 6 is a pressure-enthalpy diagram of yet another air conditioning system operating in a heating mode in accordance with some embodiments.

The difference from the phase change process of the refrigerant shown in FIG. 2 is that when the air conditioning system 10 shown in FIG. 6 operates in the heating mode, the refrigerant in the auxiliary path and the refrigerant in the main path will exchange heat in the subcooling heat exchanger 1123, so that the state point corresponding to the refrigerant in the auxiliary path is changed from point I to point J' (it can be understood that the reason why the state point corresponding to the refrigerant in the auxiliary path migrates from point J to point J' is that the refrigerant absorbs heat from the auxiliary heater 1124). Then, the refrigerant corresponding to the state point J' is mixed with the refrigerant corresponding to the state point K to be a refrigerant corresponding to a state point L'. Finally, the refrigerant corresponding to the state point L' is compressed by the compressor 115, and the state point corresponding to the refrigerant is changed from point L' to point A'.

It can be understood that in a process of the state point corresponding to the refrigerant being changed from point I to point J', the auxiliary heater 1124 heats the refrigerant continuously, so that the refrigerant may enter the compressor 115 through the gas-liquid separator 114. In this way, the circulation efficiency of the refrigerant may be improved, thereby improving the cooling or heating efficiency of the air conditioning system.

Figure 7:
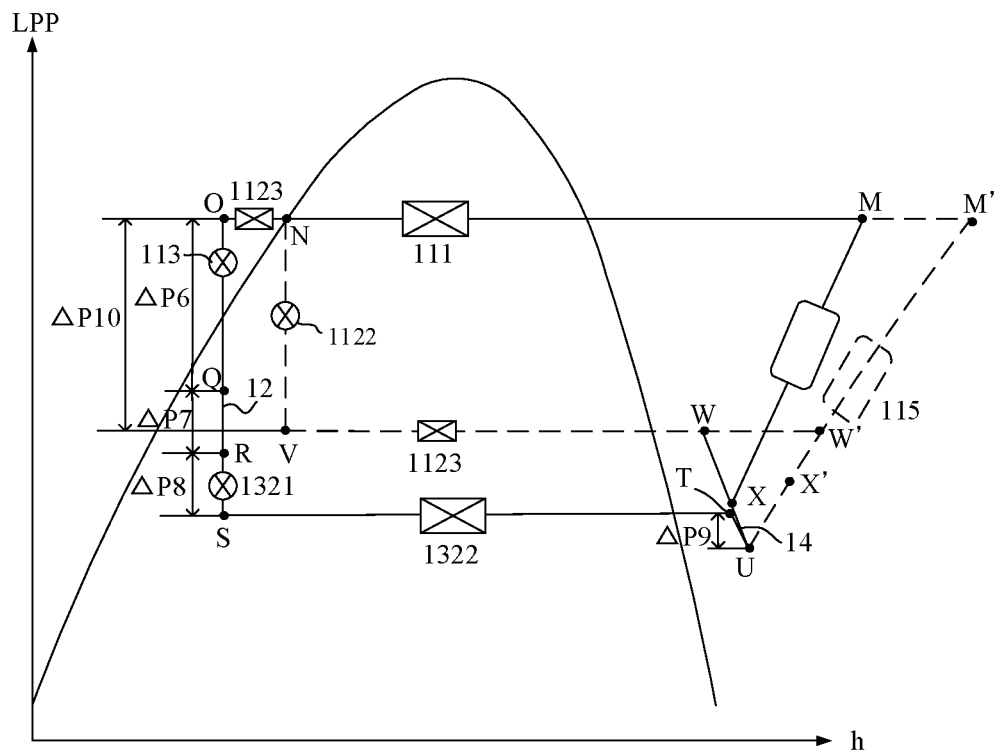
FIG. 7 is a pressure-enthalpy diagram of yet another air conditioning system operating in a cooling mode, in accordance with some embodiments.

FIG. 7 is a pressure-enthalpy diagram of yet another air conditioning system operating in a cooling mode in accordance with some embodiments.

The difference from the phase change process of the refrigerant shown in FIG. 3 is that the refrigerant in the auxiliary path and the refrigerant in the main path shown in FIG. 7 exchange heat in the subcooling heat exchanger 1123, so that the state point corresponding to the refrigerant in the auxiliary path is changed from point V to point W' (it can be understood that the reason why the state point corresponding to the refrigerant in the auxiliary path migrates from point W to point W' is that the refrigerant absorbs the heat from the auxiliary heater 1124). Then, the refrigerant corresponding to the state point W' is mixed with the refrigerant corresponding to the state point U to be a refrigerant corresponding to a state point X'. Finally, the refrigerant corresponding to the state point X is compressed by the compressor 115, and the state point corresponding to the refrigerant is changed from point X to point M'.

It can be understood that in a process of the state point corresponding to the refrigerant being changed from point V to point W', the auxiliary heater 1124 heats the refrigerant continuously, so that the refrigerant may enter the compressor 115 through the gas-liquid separator 114. In this way, the circulation efficiency of the refrigerant may be improved, thereby improving the cooling or heating efficiency of the air conditioning system.

Figure 8:
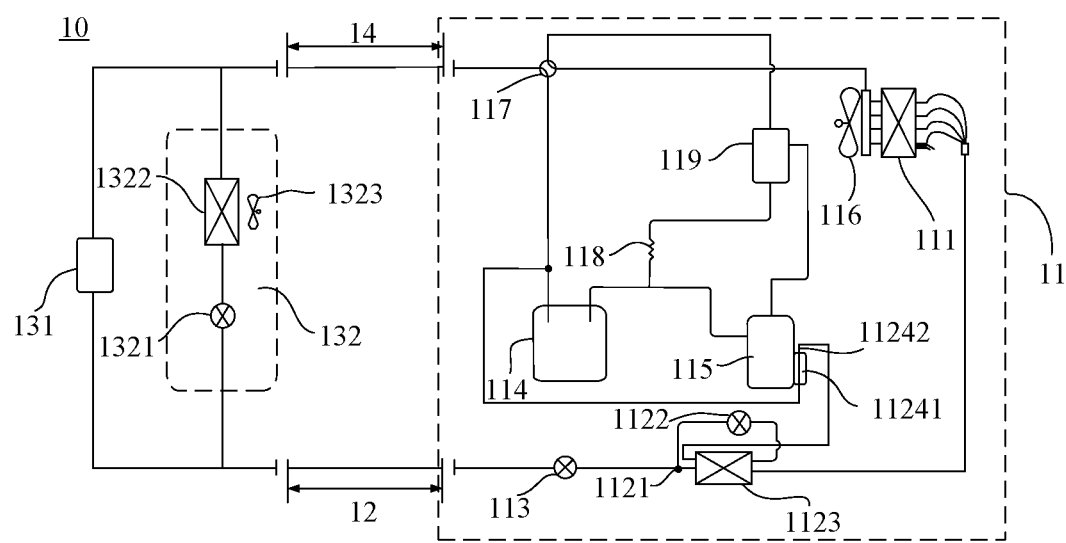
FIG. 8 is a structural diagram of yet another air conditioning system, in accordance with some embodiments.

FIG. 8 is a structural diagram of yet another air conditioning system in accordance with some embodiments.

In some embodiments, as shown in FIG. 8, the auxiliary heater 1124 includes a heat conductor 11241 and a first heat conduction pipe 11242. The heat conductor 11241 is attached to a heating end of the compressor 115, so that the refrigerant flowing through the heat conductor 11241 may be heated by the heat in the compressor 115. The first heat conduction pipe 11242 is connected to the subcooling heat exchanger 1123 and the gas-liquid separator 114, and the first heat conduction pipe 11242 passes through the heat conductor 11241. The first heat conduction pipe 11242 is configured to convey the refrigerant flowing from the subcooling heat exchanger 1123 to the gas-liquid separator 114 and promote heat exchange between the refrigerant and the heat conductor 11241.

Figure 9:
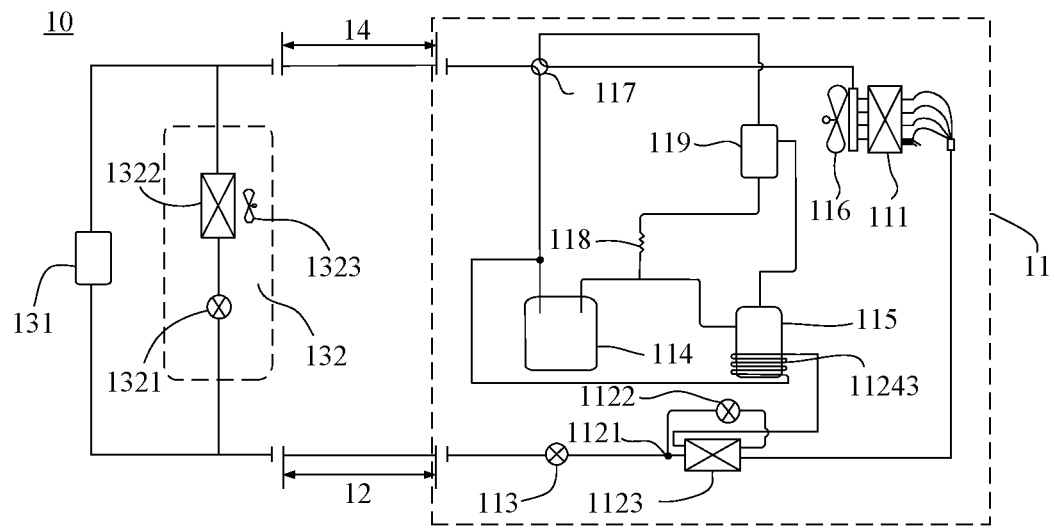
FIG. 9 is a structural diagram of yet another air conditioning system, in accordance with some embodiments.

FIG. 9 is a structural diagram of yet another air conditioning system in accordance with some embodiments.

In some embodiments, as shown in FIG. 9, the auxiliary heater 1124 includes a second heat conduction pipe 11243. The second heat conduction pipe 11243 is connected to the subcooling heat exchanger 1123 and the gas-liquid separator 114 and is configured to convey the refrigerant flowing from the subcooling heat exchanger 1123 to the gas-liquid separator 114. The second heat conduction pipe 11243 corresponds to a position of a heating end of the compressor 115 and is attached to the compressor 115. For example, the second heat conduction pipe 11243 is wrapped around an outer peripheral surface of the compressor 115 along a circumferential direction of the compressor 115, so as to be in contact with the heating end of the compressor 115.

Therefore, the heat generated by the compressor 115 may be used to heat the refrigerant in the second heat conduction pipe 11243.

Figure 10:
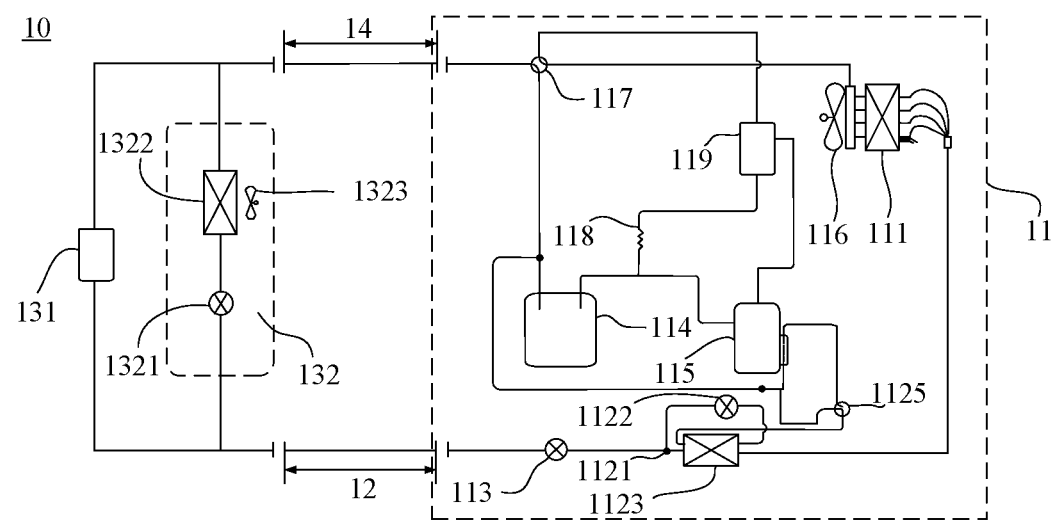
FIG. 10 is a structural diagram of yet another air conditioning system, in accordance with some embodiments.

FIG. 10 is a structural diagram of yet another air conditioning system in accordance with some embodiments.

In some embodiments, as shown in FIG. 10, the refrigerant phase change device 112 further includes a three-way valve 1125. A first end of the three-way valve 1125 is connected to the subcooling heat exchanger 1123, a second end of the three-way valve 1125 is connected to the auxiliary heater 1124, and a third end of the three-way valve 1125 is connected to the gas-liquid separator 114.

The three-way valve 1125 is configured to control the connection between the first end and the second end and the disconnection between the first end and the third end in a case where a superheat degree of the compressor 115 is greater than or equal to a first preset threshold. That is, in the case where the superheat degree of the compressor 115 is greater than or equal to the first preset threshold, the three-way valve 1125 may open the refrigerant flow path between the subcooling heat exchanger 1123 and the auxiliary heater 1124 and close the refrigerant flow path between the subcooling heat exchanger 1123 and the gas-liquid separator 114.

The three-way valve 1125 is further configured to control the connection between the first end and the third end and the disconnection between the first end and the second end in a case where the superheat degree of the compressor 115 is less than or equal to a second preset threshold. That is, in the case where the superheat degree of the compressor 115 is less than or equal to the second preset threshold, the three-way valve 1125 may close the refrigerant flow path between the subcooling heat exchanger 1123 and the auxiliary heater 1124 and open the refrigerant flow path between the subcooling heat exchanger 1123 and the gas-liquid separator 114.

For example, the second preset threshold is smaller than the first preset threshold. For example, the first preset threshold may be 40° C., and the second preset threshold may be 15° C.

In some embodiments, the three-way valve 1125 is connected to the subcooling heat exchanger 1123, the auxiliary heater 1124, and the gas-liquid separator 114. The three-way valve 1125 is configured to be switched between a first position and a second position.

In a case where the three-way valve 1125 is switched to the first position, the refrigerant flow path between the subcooling heat exchanger 1123 and the auxiliary heater 1124 is opened, and the refrigerant flow path between the subcooling heat exchanger 1123 and the gas-liquid separator 114 is closed. In a case where the three-way valve 1125 is switched to the second position, the refrigerant flow path between the subcooling heat exchanger 1123 and the auxiliary heater 1124 is closed, and the refrigerant flow path between the subcooling heat exchanger 1123 and the gas-liquid separator 114 is opened.

The outdoor unit 11 is further configured to control the three-way valve 1125 to be switched to the first position in a case where the superheat degree of the compressor is greater than or equal to the first preset threshold and control the three-way valve 1125 to be switched to the second position in a case where the superheat degree of the compressor is less than or equal to the second preset threshold.

In some embodiments, the refrigerant phase change device 112 may further include a first solenoid valve and a second solenoid valve. The first solenoid valve is connected to the gas-liquid separator 114 and the subcooling heat exchanger 1123, and the first solenoid valve is configured to be turned on in a case where the superheat degree of the compressor 115 is greater than or equal to the first preset threshold, and to be turned off in a case where the superheat degree of the compressor 115 is less than or equal to the second preset threshold.

The second solenoid valve is connected to the auxiliary heater 1124 and the subcooling heat exchanger 1123, and the second solenoid valve is configured to be turned on in the case where the superheat degree of the compressor 115 is less than the first preset threshold, and to be turned off in the case where the superheat degree of the compressor 115 is greater than the second preset threshold.

In some embodiments, the outdoor unit 11 further includes a compressor discharge temperature sensor for detecting a discharge temperature of the compressor 115.

In some embodiments, the outdoor unit 11 further includes an outdoor heat exchanger liquid pipe temperature sensor for detecting a temperature of a liquid pipe of the outdoor heat exchanger 111.

In some embodiments, the outdoor unit 11 further includes an outdoor heat exchanger middle position temperature sensor for detecting a temperature of a middle position of the outdoor heat exchanger 111.

In some embodiments, the outdoor unit 11 further includes an outdoor environment temperature sensor for detecting a temperature of the outdoor environment.

In some embodiments, the outdoor unit 11 further includes a subcooling heat exchanger main path temperature sensor for detecting a temperature of the main path of the subcooling heat exchanger 1123.

In some embodiments, the outdoor unit 11 further includes a gas-liquid separator inlet temperature sensor for detecting an inlet temperature of the gas-liquid separator 114.

In some embodiments, the indoor unit 132 further includes an indoor unit liquid pipe temperature sensor for detecting a temperature of a liquid pipe of the indoor unit.

In some embodiments, the indoor unit 132 further includes an indoor unit sucking temperature sensor for detecting a temperature of the air sucked by the indoor unit 132.

In some embodiments, the indoor unit 132 further includes an indoor heat exchanger middle position temperature sensor for detecting a temperature of a middle position of the indoor heat exchanger 1322.

In some embodiments, the indoor unit 132 further includes an indoor unit air pipe temperature sensor for detecting a temperature of an air pipe of the indoor unit 132.

It will be noted that the middle positions of the indoor heat exchanger and the outdoor heat exchanger in some embodiments of the present disclosure are not limited to central positions of the indoor heat exchanger and the outdoor heat exchanger. For example, the middle positions of the indoor heat exchanger and the outdoor heat exchanger may be middle positions along length directions, width directions, or height directions of the indoor heat exchanger and the outdoor heat exchanger, or middle positions along other directions of the indoor heat exchanger and the outdoor heat exchanger, which are not limited in the present disclosure.

Some embodiments of the present disclosure provide a control method of an air conditioning system.

In some embodiments, in a case where the air conditioning system 10 operates in the cooling mode, a current subcooling degree of the main path of the subcooling heat exchanger is T_sc. A temperature detected by the outdoor heat exchanger liquid pipe temperature sensor is an inlet temperature of the outdoor heat exchanger 111, and a detected value is T_b. A detection value of the subcooling heat exchanger main path temperature sensor is T_e. A difference between T_b and T_e is the current subcooling degree T_sc of the main path of the subcooling heat exchanger (i.e., T_sc=T_b−T_e).

A target subcooling degree of the main path of the subcooling heat exchanger is T_sco, and T_sco is a preset control constant. For example, the target subcooling degree T_sco of the main path of the subcooling heat exchanger may be any value from 3° C. to 5° C. A difference between the current subcooling degree T_sc of the main path of the subcooling heat exchanger and the target subcooling degree T_sco of the main path of the subcooling heat exchanger is a first difference ΔT_sc (i.e., ΔT_sc=T_sc−T_sco).

It can be understood that the current subcooling degree T_sc of the main path of the subcooling heat exchanger may be adjusted by controlling an opening degree of the first expansion valve 113, so that the current subcooling degree T_sc of the main path of the subcooling heat exchanger is close to the target subcooling degree T_sco of the main path of the subcooling heat exchanger.

In this way, in a case where ΔT_sc (n) is greater than or equal to a first preset value α ° C. (i.e., ΔT_sc (n)≥α° C.), the outdoor unit 11 may control the opening degree of the first expansion valve 113 to increase, so as to reduce the current subcooling degree T_sc of the main path of the subcooling heat exchanger, that is, to reduce the difference ΔT_sc. In a case where ΔT_sc (n) is less than the first preset value α ° C. (i.e., ΔT_sc (n)<α), the outdoor unit 11 may control the opening degree of the first expansion valve 113 to decrease, so as to enhance the current subcooling degree T_sc of the main path of the subcooling heat exchanger, so that the current subcooling degree T_sc of the main path of the subcooling heat exchanger may be maintained greater than or equal to the target subcooling degree T_sco of the main path of the subcooling heat exchanger.

It will be noted that n is an n-th moment at which the air conditioning system 10 is operating, and a is a preset control constant, for example, a is any value greater than or equal to 0 (i.e., a 0).

It can be understood that the current subcooling degree T_sc of the main path of the subcooling heat exchanger is calculated according to the temperature values detected by the sensors, and then the opening degree of the first expansion valve 113 is controlled according to the difference ΔT_sc between the current subcooling degree T_sc of the main path of the subcooling heat exchanger and the target subcooling degree T_sco of the main path of the subcooling heat exchanger and the first preset value, so that the difference ΔT_sc changes around the first preset value and is close to the first preset value, thereby implementing automatic control of the current subcooling degree T_sc of the main path of the subcooling heat exchanger and the difference ΔT_sc.

In some embodiments, in a case where the air conditioning system 10 operates in the cooling mode, a detection value of the compressor discharge temperature sensor is T_a, a detection value of the outdoor heat exchanger middle position temperature sensor is T_c, and a difference between T_a and T_c is a current superheat degree Td_SH of the discharge of the compressor 115 (i.e., Td_SH=T_a−T_c). A target superheat degree of the discharge of the compressor 115 is Td_SHo, and Td_SHo is a preset control constant. For example, the target superheat degree Td_SHo of the discharge of the compressor 115 may be any value from 20° C. to 30° C.

It can be understood that the outdoor unit 11 may control the current superheat degree Td_SH of the discharge of the compressor 115 by controlling the opening degree of the third expansion valve 1122, so that the current superheat degree Td_SH of the discharge of the compressor 115 is close to the target superheat degree Td_SHo of the discharge of the compressor 115.

A difference between the current superheat degree Td_SH of the discharge of the compressor 115 and the target superheat degree Td_SHo of the discharge of the compressor 115 is a third difference ΔTd_SH (i.e., ΔTd_SH=Td_SH−Td_SHo).

In this way, in a case where ΔTd_SH (n) is greater than or equal to a third preset value β° C. (i.e., ΔTd_SH (n)≥β° C.), the outdoor unit 11 may control the opening degree of the third expansion valve 1122 to increase, so as to reduce the current superheat degree Td_SH of the discharge of the compressor 115, that is, to reduce the difference ΔTd_SH. In a case where ΔTd_SH (n) is less than the third preset value β° C. (i.e., ΔTd_SH (n)<β), the outdoor unit 11 may control the opening degree of the third expansion valve 1122 to decrease, so as to enhance the current superheat degree Td_SH of the discharge of the compressor 115, so that the current superheat degree Td_SH of the discharge of the compressor 115 may be maintained greater than or equal to the target superheat degree Td_SHo of the discharge of the compressor 115.

It will be noted that β is a preset control constant, for example, β is any value greater than or equal to 0 (i.e., β≥0), and n is an n-th moment at which the air conditioning system 10 is operating.

It can be understood that the current superheat degree Td_SH of the discharge of the compressor 115 is calculated according to the temperature values detected by the sensors, and then the opening degree of the third expansion valve 1122 is controlled according to the difference ΔTd_SH between the current superheat degree Td_SH of the discharge of the compressor 115 and the target superheat degree Td_SHo of the discharge of the compressor 115 and the third preset value, so that the difference ΔTd_SH changes around the third preset value and is close to the third preset value, thereby implementing automatic control of the current superheat degree Td_SH of the discharge of the compressor 115 and the difference ΔTd_SH.

In some embodiments, in a case where the air conditioning system 10 operates in the cooling mode, a detection value of the indoor heat exchanger middle position temperature sensor is T_i, and a detection value of the indoor unit air pipe temperature sensor is T_j, and a difference between T_i and T_j is a current superheat degree T_SH of the indoor heat exchanger 1322 (i.e., T_SH=T_j−T_i). A target superheat degree of the indoor heat exchanger 1322 is T_SHo, and T_SHo is a preset control constant. For example, the target superheat degree T_SHo of the indoor heat exchanger 1322 is any value from 0° C. to 5° C.

It can be understood that the current superheat degree T_SH of the indoor heat exchanger 1322 may be adjusted by controlling an opening degree of the second expansion valve 1321, so that the current superheat degree T_SH of the indoor heat exchanger 1322 is close to the target superheat degree T_SHo of the indoor heat exchanger 1322.

A difference between the current superheat degree T_SH of the indoor heat exchanger 1322 and the target superheat degree T_SHo of the indoor heat exchanger 1322 is a second difference ΔT_SH (i.e., ΔT_SH=T_SH−T_SHo).

In this way, in a case where ΔT_SH (n) is greater than or equal to a second preset value γ ° C. (i.e., ΔT_SH (n)≥γ° C.), the outdoor unit 11 may control the opening degree of the second expansion valve 1321 to increase, so as to reduce the current superheat degree T_SH of the indoor heat exchanger 1322, that is, to reduce the difference ΔT_SH. In a case where ΔT_SH (n) is less than the second preset value γ ° C., (i.e., ΔT_SH (n)<γ° C.), the outdoor unit 11 may control the opening degree of the second expansion valve 1321 to decrease, so as to enhance the current superheat degree T_SH of the indoor heat exchanger 1322, so that the current superheat degree T_SH of the indoor heat exchanger 1322 may be maintained greater than or equal to the target superheat degree T_SHo of the indoor heat exchanger 1322.

It will be noted that γ is a preset control constant, for example, γ is any value greater than or equal to 0 (i.e., γ≥0), and n is an n-th moment at which the air conditioning system 10 is operating.

It can be understood that the current superheat degree T_SH of the indoor heat exchanger 1322 is calculated according to the temperature values detected by the sensors, and then the opening degree of the second expansion valve 1321 is controlled according to the difference ΔT_SH between the current superheat degree T_SH of the indoor heat exchanger 1322 and the target superheat degree T_SHo of the indoor heat exchanger 1322 and the second preset value, so that the difference ΔT_SH changes around the second preset value and is close to the second preset value, thereby implementing automatic control of the current superheat degree T_SH of the indoor heat exchanger 1322 and the difference ΔT_SH.

In some embodiments, in a case where the air conditioning system 10 operates in the heating mode, a temperature value detected by the outdoor heat exchanger middle position temperature sensor is an inlet temperature T_c of the outdoor heat exchanger 111, and a temperature value detected by the gas-liquid separator inlet temperature sensor is an outlet temperature T_f of the outdoor heat exchanger 111, and a difference between T_c and T_f is a current superheat degree TS_SH of the outdoor heat exchanger 111 (i.e., TS_SH=T_f−T_c). A target superheat degree of the outdoor heat exchanger 111 is TS_SHo, and TS_SHo is a preset control constant. For example, the target superheat degree TS_SHo of the outdoor heat exchanger 111 is any value from 0° C. to 5° C.

It can be understood that the current superheat degree TS_SH of the outdoor heat exchanger 111 may be adjusted by controlling an opening degree of the first expansion valve 113, so that the current superheat degree TS_SH of the outdoor heat exchanger 111 is close to the target superheat degree TS_SHo of the outdoor heat exchanger 111.

A difference between the current superheat degree TS_SH of the outdoor heat exchanger 111 and the target superheat degree TS_SHo of the outdoor heat exchanger 111 is a fourth difference ΔTS_SH (i.e., ΔTS_SH=TS_SH−TS_SHo).

In this way, in a case where ΔTS_SH (n) is greater than or equal to a fourth preset value α ° C. (i.e., ΔTS_SH (n) ° C.), the outdoor unit 11 may control the opening degree of the first expansion valve 113 to increase, so as to reduce the current superheat degree TS_SH of the outdoor heat exchanger 111, that is, to reduce the difference ΔTS_SH. In a case where ΔTS_SH (n) is less than the fourth preset value b ° C. (i.e., ΔTS_SH (n)<δ C.), the outdoor unit 11 may control the opening degree of the first expansion valve 113 to decrease, so as to enhance the current superheat degree TS_SH of the outdoor heat exchanger 111, so that the current superheat degree TS_SH of the outdoor heat exchanger 111 may be maintained greater than or equal to the target superheat degree TS_SHo of the outdoor heat exchanger 111.

It will be noted that δ is a preset control constant, for example, b is any value greater than or equal to 0 (i.e., δ≥0), and n is an n-th moment at which the air conditioning system 10 is operating.

It can be understood that the current superheat degree TS_SH of the outdoor heat exchanger 111 is calculated according to the temperature values detected by the sensors, and then the opening degree of the first expansion valve 113 is controlled according to the difference ΔTS_SH between the current superheat degree TS_SH of the outdoor heat exchanger 111 and the target superheat degree TS_SHo of the outdoor heat exchanger 111 and the fourth preset value, so that the difference ΔTS_SH changes around the fourth preset value and is close to the fourth preset value, thereby implementing automatic control of the current superheat degree TS_SH of the outdoor heat exchanger 111 and the difference ΔTS_SH.

In some embodiments, in a case where the air conditioning system 10 is in the heating mode, a temperature value detected by the indoor unit liquid pipe temperature sensor is T_g, and a temperature value detected by the indoor heat exchanger middle position temperature sensor is T_i, and a difference between T_g and T_i is a current subcooling degree Ti_sc of the indoor heat exchanger 1322 (i.e., Ti_sc=T_i−T_g). A target subcooling degree of the indoor heat exchanger 1322 is Ti_sco, and Ti_sco is a preset control constant. For example, the target subcooling degree Ti_sco of the indoor heat exchanger 1322 is any value from 3° C. to 5° C.

It can be understood that the current subcooling degree Ti_sc of the indoor heat exchanger 1322 may be adjusted by controlling the opening degree of the second expansion valve 1321, so that the current subcooling degree Ti_sc of the indoor heat exchanger 1322 is close to the target subcooling degree Ti_sco of the indoor heat exchanger 1322.

A difference between the current subcooling degree Ti_sc of the indoor heat exchanger 1322 and the target subcooling degree Ti_sco of the indoor heat exchanger 1322 is a fifth difference ΔTi_sc (i.e., ΔTi_sc=Ti_sc−Ti_sco).

In this way, in a case where ΔTi_sc (n) is greater than or equal to a fifth preset value η° C. (i.e., ΔTi_sc (n)≥η00), the outdoor unit 11 may control the opening degree of the second expansion valve 1321 to increase, so as to reduce the current subcooling degree Ti_sc of the indoor heat exchanger 1322, that is, to reduce the difference ΔTi_sc. In a case where ΔTi_sc (n) is less than the fifth preset value n ° C. (i.e., ΔTi_sc (n)<η), the outdoor unit 11 may control the opening degree of the second expansion valve 1321 to decrease, so as to enhance the current subcooling degree Ti_sc of the indoor heat exchanger 1322, so that the current subcooling degree Ti_sc of the indoor heat exchanger 1322 may be maintained greater than or equal to the target subcooling degree Ti_sco of the indoor heat exchanger 1322.

It will be noted that η is a preset control constant, for example, η is any value greater than or equal to 0 (i.e., η≥0), and n is an n-th moment at which the air conditioning system 10 is operating.

It can be understood that the current subcooling degree Ti_sc of the indoor heat exchanger 1322 is calculated according to the temperature values detected by the sensors, and then the opening degree of the second expansion valve 1321 is controlled according to the difference ΔTi_sc between the current subcooling degree Ti_sc of the indoor heat exchanger 1322 and the target subcooling degree Ti_sco of the indoor heat exchanger 1322 and the fifth preset value, so that the difference ΔTi_sc changes around the fifth preset value and is close to the fifth preset value, thereby implementing automatic control of the current subcooling degree Ti_sc of the indoor heat exchanger 1322 and the difference ΔTi_sc.

Figure 11:
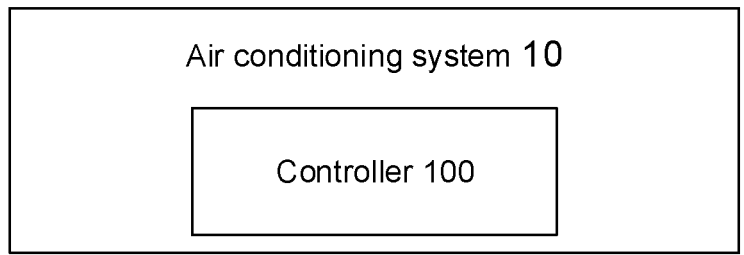
FIG. 11 is a block diagram of an air conditioning system, in accordance with some embodiments.

In some embodiments, as shown in FIG. 11, the air conditioning system 10 further includes a controller 100. The controller 10 is coupled to the first expansion valve, the second expansion valve, and the third expansion valve and configured to adjust an opening degree of at least one of the first expansion valve, the second expansion valve, and the third expansion valve.

Figure 12:
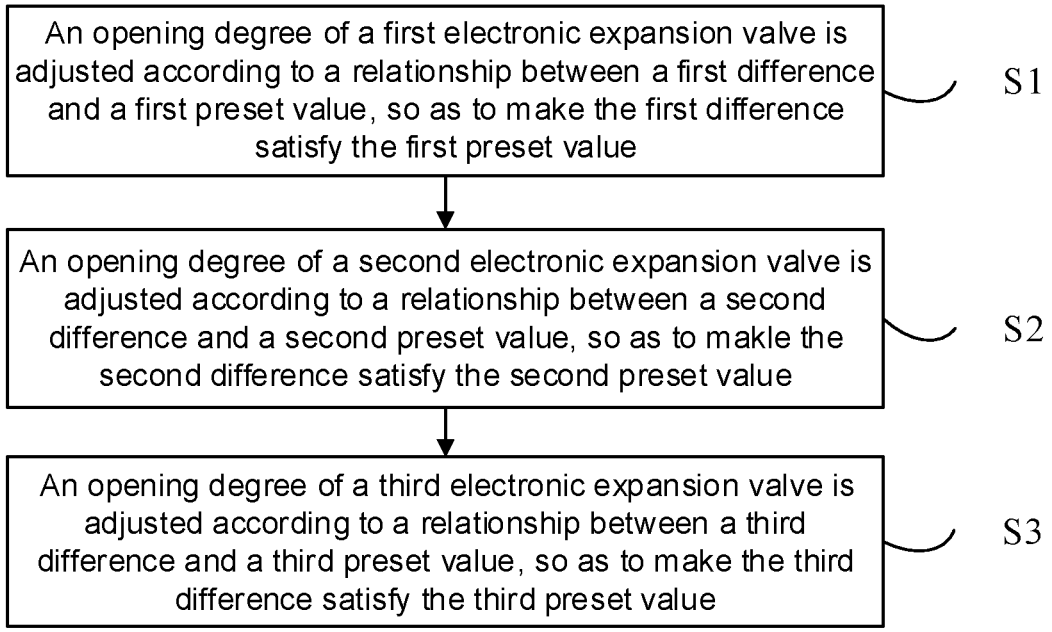
FIG. 12 is a flow diagram of a control method of an air conditioning system, in accordance with some embodiments.

As shown in FIG. 12, in the cooling mode, the control method of the air conditioning system 10 includes steps S1 to S3.

In step S1, an opening degree of the first expansion valve is adjusted according to a relationship between a first difference and a first preset value, so as to make the first difference satisfy the first preset value.

For example, the first difference is a difference between the current subcooling degree of the main path of the subcooling heat exchanger and the target subcooling degree of the main path of the subcooling heat exchanger.

In step S2, an opening degree of the second expansion valve is adjusted according to a relationship between a second difference and a second preset value, so as to make the second difference satisfy the second preset value.

For example, the second difference is a difference between the current superheat degree of the indoor heat exchanger and the target superheat degree of the indoor heat exchanger.

In step S3, an opening degree of the third expansion valve is adjusted according to a relationship between a third difference and a third preset value, so as to make the third difference satisfy the third preset value.

For example, the third difference is a difference between the current superheat degree of the discharge of the compressor and the target superheat degree of the discharge of the compressor.

Figure 13:
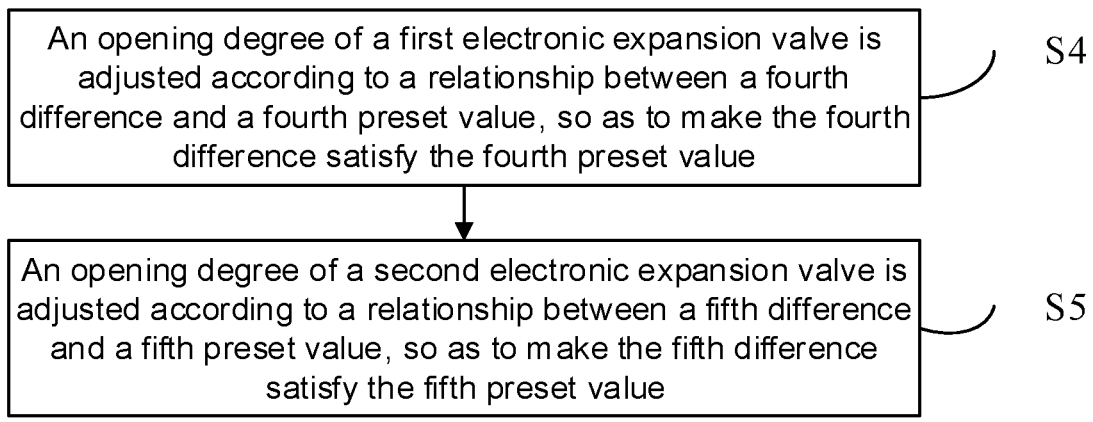
FIG. 13 is a flow diagram of another control method of an air conditioning system, in accordance with some embodiments.

As shown in FIG. 13, in the heating mode, the control method of the air conditioning system 10 further includes steps S4 to S5.

In step S4, the opening degree of the first expansion valve is adjusted according to a relationship between a fourth difference and a fourth preset value, so as to make the fourth difference satisfy the fourth preset value.

For example, the fourth difference is a difference between the current superheat degree of the outdoor heat exchanger and the target superheat degree of the outdoor heat exchanger.

In step S5, the opening degree of the second expansion valve is adjusted according to a relationship between a fifth difference and a fifth preset value, so as to make the fifth difference satisfy the fifth preset value.

For example, the fifth difference is a difference between the current subcooling degree of the indoor heat exchanger and the target subcooling degree of the indoor heat exchanger.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

A person skilled in the art will understand that the scope of disclosure in the present disclosure is not limited to the above specific embodiments and may modify and substitute some elements of the embodiments without departing from the concept of the present disclosure. The scope of the present disclosure is limited by the appended claims.

What is claimed is:

1. An air conditioning system, comprising an outdoor unit and at least one indoor unit, wherein
   the outdoor unit includes:
   a compressor;
   an outdoor heat exchanger;
   a first expansion valve; and
   a refrigerant phase change device, including:
   a subcooling heat exchanger having a main path and an auxiliary path; the subcooling heat exchanger being connected to the first expansion valve and the outdoor heat exchanger and located between the first expansion valve and the outdoor heat exchanger; and
   a third expansion valve, both ends thereof being connected to the first expansion valve and the subcooling heat exchanger; and
   an indoor unit includes an indoor heat exchanger and a second expansion valve; the second expansion valve being connected to the indoor heat exchanger and the first expansion valve and located between the indoor heat exchanger and the first expansion valve, wherein
   in a cooling mode, the outdoor unit is configured to:
   adjust an opening degree of the first expansion valve according to a relationship between a first difference and a first preset value, so as to make the first difference satisfy the first preset value; wherein the first difference is a difference between a current subcooling degree of the main path of the subcooling heat exchanger and a target subcooling degree of the main path of the subcooling heat exchanger;
   adjust an opening degree of the second expansion valve according to a relationship between a second difference and a second preset value, so as to make the second difference satisfy the second preset value; wherein the second difference is a difference between a current superheat degree of the indoor heat exchanger and a target superheat degree of the indoor heat exchanger; and
   adjust an opening degree of the third expansion valve according to a relationship between a third difference and a third preset value, so as to make the third difference satisfy the third preset value; wherein the third difference is a difference between a current superheat degree of discharge of the compressor and a target superheat degree of the discharge of the compressor.

2. The air conditioning system according to claim 1, wherein adjusting the opening degree of the first expansion valve according to the relationship between the first difference and the first preset value, so as to make the first difference satisfy the first preset value, includes:
   controlling the opening degree of the first expansion valve to increase in a case where the first difference is greater than or equal to the first preset value, so as to reduce the current subcooling degree of the main path of the subcooling heat exchanger; and
   controlling the opening degree of the first expansion valve to decrease in a case where the first difference is less than the first preset value, so as to enhance the current subcooling degree of the main path of the subcooling heat exchanger.

3. The air conditioning system according to claim 2, wherein adjusting the opening degree of the second expansion valve according to the relationship between the second difference and the second preset value, so as to make the second difference satisfy the second preset value, includes:
   controlling the opening degree of the second expansion valve to increase in a case where the second difference is greater than or equal to the second preset value, so as to reduce the current superheat degree of the indoor heat exchanger; and
   controlling the opening degree of the second expansion valve to decrease in a case where the second difference is less than the second preset value, so as to enhance the current superheat degree of the indoor heat exchanger.

4. The air conditioning system according to claim 3, wherein adjusting the opening degree of the third expansion valve according to the relationship between the third difference and the third preset value, so as to make the third difference satisfy the third preset value, includes:
   controlling the opening degree of the third expansion to increase in a case where the third difference is greater than or equal to the third preset value, so as to reduce the current superheat degree of the discharge of the compressor; and
   controlling the opening degree of the third expansion to decrease in a case where the third difference is less than the third preset value, so as to enhance the current superheat degree of the discharge of the compressor.

5. The air conditioning system according to claim 1, wherein in the cooling mode, the subcooling heat exchanger is configured to allow refrigerants in two paths, into which a gas-liquid two-phase refrigerant with medium-temperature and high-pressure from the outdoor heat exchanger after passing through the subcooling heat exchanger is divided, to enter the main path and the auxiliary path of the subcooling heat exchanger respectively;
   a refrigerant in the main path is configured to flow toward the first expansion valve, and a refrigerant in the auxiliary path is configured to flow toward the third expansion valve;
   the third expansion valve is configured to throttle the refrigerant in the auxiliary path to a gas-liquid two-phase refrigerant with low-temperature and low-pressure and convey the gas-liquid two-phase refrigerant with low-temperature and low-pressure to the subcooling heat exchanger; and
   the subcooling heat exchanger is further configured to make the gas-liquid two-phase refrigerant with low-temperature and low-pressure in the auxiliary path exchange heat with the gas-liquid two-phase refrigerant with medium-temperature and high-pressure in the main path, so as to make the gas-liquid two-phase refrigerant with medium-temperature and high-pressure in the main path change to a subcooled liquid refrigerant with medium-temperature and high-pressure.

6. The air conditioning system according to claim 1, wherein in a heating mode, the outdoor unit is further configured to:
   adjust the opening degree of the first expansion valve according to a relationship between a fourth difference and a fourth preset value, so as to make the fourth difference satisfy the fourth preset value; wherein the fourth difference is a difference between a current superheat degree of the outdoor heat exchanger and a target superheat degree of the outdoor heat exchanger; and
   adjust the opening degree of the second expansion valve according to a relationship between a fifth difference and a fifth preset value, so as to make the fifth difference satisfy the fifth preset value; wherein the fifth difference is a difference between a current subcooling degree of the indoor heat exchanger and a target subcooling degree of the indoor heat exchanger.

7. The air conditioning system according to claim 6, wherein adjusting the opening degree of the first expansion valve according to the relationship between the fourth difference and the fourth preset value, so as to make the fourth difference satisfy the fourth preset value, includes:
   controlling the opening degree of the first expansion valve to increase in a case where the fourth difference is greater than or equal to the fourth preset value, so as to reduce the current superheat degree of the outdoor heat exchanger; and
   controlling the opening degree of the first expansion valve to decrease in a case where the fourth difference is less than the fourth preset value, so as to enhance the current superheat degree of the outdoor heat exchanger.

8. The air conditioning system according to claim 6, wherein adjusting the opening degree of the second expansion valve according to the relationship between the fifth difference and the fifth preset value, so as to make the fifth difference satisfy the fifth preset value, includes:
   controlling the opening degree of the second expansion valve to increase in a case where the fifth difference is greater than or equal to the fifth preset value, so as to reduce the current subcooling degree of the indoor heat exchanger; and
   controlling the opening degree of the second expansion to decrease in a case where the fifth difference is less than the fifth preset value, so as to enhance the current subcooling degree of the indoor heat exchanger.

9. The air conditioning system according to claim 6, wherein the outdoor unit further includes a gas-liquid separator;
   in the heating mode, the current superheat degree of the outdoor heat exchanger is a difference between an inlet temperature of the outdoor heat exchanger and an inlet temperature of the gas-liquid separator, and the current subcooling degree of the indoor heat exchanger is a difference between a temperature of a liquid pipe of the indoor unit and a temperature of a middle position of the indoor heat exchanger.

10. The air conditioning system according to claim 1, wherein in a heating mode, the first expansion valve is configured to decompress a gas-liquid two-phase refrigerant with medium-temperature and high-pressure from the indoor unit to obtain a gas-liquid two-phase refrigerant in a first temperature-pressure state;
   the third expansion valve is configured to cool down and decompress a part of the gas-liquid two-phase refrigerant in the first temperature-pressure state in the auxiliary path to obtain a gas-liquid two-phase refrigerant in a second temperature-pressure state; and
   the subcooling heat exchanger is configured to make a remaining part of the gas-liquid two-phase refrigerant in the first temperature-pressure state in the main path exchange heat with the gas-liquid two-phase refrigerant in the second temperature-pressure state, so as to make the remaining part of the gas-liquid two-phase refrigerant in the first temperature-pressure state change to a liquid refrigerant in the first temperature-pressure state.

11. The air conditioning system according to claim 10, wherein in the cooling mode, the subcooling heat exchanger is further configured to allow refrigerants in two paths, into which a gas-liquid two-phase refrigerant with medium-temperature and high-pressure from the outdoor heat exchanger after passing through the subcooling heat exchanger is divided, to enter the main path and the auxiliary path of the subcooling heat exchanger respectively;
- a refrigerant in the main path is configured to flow toward the first expansion valve, and a refrigerant in the auxiliary path is configured to flow toward the third expansion valve;
- the third expansion valve is further configured to throttle the refrigerant in the auxiliary path to a gas-liquid two-phase refrigerant with low-temperature and low-pressure and convey the gas-liquid two-phase refrigerant with low-temperature and low-pressure to the subcooling heat exchanger; and
- the subcooling heat exchanger is further configured to make the gas-liquid two-phase refrigerant with low-temperature and low-pressure in the auxiliary path exchange heat with the gas-liquid two-phase refrigerant with medium-temperature and high-pressure in the main path, so as to make the gas-liquid two-phase refrigerant with medium-temperature and high-pressure in the main path change to a subcooled liquid refrigerant with medium-temperature and high-pressure; and
- in the heating mode, the outdoor unit is further configured to:
- adjust the opening degree of the first expansion valve according to a relationship between a fourth difference and a fourth preset value, so as to make the fourth difference satisfy the fourth preset value; wherein the fourth difference is a difference between a current superheat degree of the outdoor heat exchanger and a target superheat degree of the outdoor heat exchanger; and
- adjust the opening degree of the second expansion valve according to a relationship between a fifth difference and a fifth preset value, so as to make the fifth difference satisfy the fifth preset value; wherein the fifth difference is a difference between a current subcooling degree of the indoor heat exchanger and a target subcooling degree of the indoor heat exchanger.

12. The air conditioning system according to claim 10, wherein the outdoor unit further includes a gas-liquid separator, and the gas-liquid separator is configured to separate a gaseous refrigerant and a liquid refrigerant;
- the subcooling heat exchanger is further configured to:
- perform heat exchange between the remaining part of the gas-liquid two-phase refrigerant in the first temperature-pressure state in the main path and the gas-liquid two-phase refrigerant in the second temperature-pressure state, so as to make the gas-liquid two-phase refrigerant in the second temperature-pressure state change to a gaseous refrigerant in the second temperature-pressure state; and
- convey the gaseous refrigerant in the second temperature-pressure state to the gas-liquid separator.

13. The air conditioning system according to claim 12, wherein the refrigerant phase change device further includes an auxiliary heater, and the auxiliary heater is connected to the subcooling heat exchanger and the gas-liquid separator and located between the subcooling heat exchanger and the gas-liquid separator; and
- the auxiliary heater is configured to heat the gaseous refrigerant in the second temperature-pressure state flowing through the auxiliary heater, so as to maintain a temperature of the gaseous refrigerant in the second temperature-pressure state.

14. The air conditioning system according to claim 13, wherein the auxiliary heater includes:
- a heat conductor attached to a heating end of the compressor; and
- a first heat conduction pipe connected to the subcooling heat exchanger and the gas-liquid separator and passing through the heat conductor.

15. The air conditioning system according to claim 13, wherein the auxiliary heater includes a second heat conduction pipe; and
- the second heat conduction pipe is connected to the subcooling heat exchanger and the gas-liquid separator, and the second heat conduction pipe is attached to a heating end of the compressor.

16. The air conditioning system according to claim 13, wherein the refrigerant phase change device further includes a three-way valve; and the three-way valve is connected to the subcooling heat exchanger, the auxiliary heater, and the gas-liquid separator;
- the three-way valve is configured to be switched between a first position and a second position; in a case where the three-way valve is switched to the first position, a refrigerant flow path between the subcooling heat exchanger and the auxiliary heater is opened, and a refrigerant flow path between the subcooling heat exchanger and the gas-liquid separator is closed; and in a case where the three-way valve is switched to the second position, the refrigerant flow path between the subcooling heat exchanger and the auxiliary heater is closed, and the refrigerant flow path between the subcooling heat exchanger and the gas-liquid separator is opened; and
- the outdoor unit is further configured to:
- control the three-way valve to be switched to the first position in a case where a superheat degree of the compressor is greater than or equal to a first preset threshold; and
- control the three-way valve to be switched to the second position in a case where the superheat degree of the compressor is less than or equal to a second preset threshold; wherein
- the second preset threshold is less than the first preset threshold.

17. The air conditioning system according to claim 1, wherein
- in the cooling mode, the current subcooling degree of the main path of the subcooling heat exchanger is a difference between an inlet temperature of the outdoor heat exchanger and a temperature of the main path of the subcooling heat exchanger; the current superheat degree of the discharge of the compressor is a difference between a discharge temperature of the compressor and a temperature of a middle position of the outdoor heat exchanger; and
- the current superheat degree of the indoor heat exchanger is a difference between a temperature of a middle position of the indoor heat exchanger and a temperature of an air pipe of the indoor unit.

18. A control method of an air conditioning system, the air conditioning system including a controller, an outdoor unit and at least one indoor unit, wherein the outdoor unit includes a compressor, an outdoor heat exchanger, a first expansion valve, and a refrigerant phase change device; the refrigerant phase change device includes a third expansion valve and a subcooling heat exchanger; the subcooling heat exchanger has a main path and an auxiliary path; the subcooling heat exchanger is connected to the first expansion valve and the outdoor heat exchanger and located between the first expansion valve and the outdoor heat exchanger; both ends of the third expansion valve are connected to the first expansion valve and the subcooling heat exchanger;

the indoor unit includes an indoor heat exchanger and a second expansion valve; the second expansion valve is connected to the indoor heat exchanger and the first expansion valve and located between the indoor heat exchanger and the first expansion valve; and the controller is coupled to the first expansion valve, the second expansion valve, and the third expansion valve and is configured to adjust an opening degree of at least one of the first expansion valve, the second expansion valve, and the third expansion valve; and in a cooling mode, the control method comprising:

adjusting an opening degree of the first expansion valve according to a relationship between a first difference and a first preset value, so as to make the first difference satisfy the first preset value; wherein the first difference is a difference between a current subcooling degree of the main path of the subcooling heat exchanger and a target subcooling degree of the main path of the subcooling heat exchanger;

adjusting an opening degree of the second expansion valve according to a relationship between a second difference and a second preset value, so as to make the second difference satisfy the second preset value; wherein the second difference is a difference between a current superheat degree of the indoor heat exchanger and a target superheat degree of the indoor heat exchanger; and adjusting an opening degree of the third expansion valve according to a relationship between a third difference and a third preset value, so as to make the third difference satisfy the third preset value; wherein the third difference is a difference between a current superheat degree of discharge of the compressor and a target superheat degree of the discharge of the compressor; and in a heating mode, the control method comprising:

adjusting the opening degree of the first expansion valve according to a relationship between a fourth difference and a fourth preset value, so as to make the fourth difference satisfy the fourth preset value; wherein the fourth difference is a difference between a current superheat degree of the outdoor heat exchanger and a target superheat degree of the outdoor heat exchanger; and adjusting the opening degree of the second expansion valve according to a relationship between a fifth difference and a fifth preset value, so as to make the fifth difference satisfy the fifth preset value; wherein the fifth difference is a difference between a current subcooling degree of the indoor heat exchanger and a target subcooling degree of the indoor heat exchanger.

19. The control method according to claim 18, wherein adjusting the opening degree of the first expansion valve according to the relationship between the first difference and the first preset value, so as to make the first difference satisfy the first preset value, includes:

controlling the opening degree of the first expansion valve to increase in a case where the first difference is greater than or equal to the first preset value, so as to reduce the current subcooling degree of the main path of the subcooling heat exchanger; and controlling the opening degree of the first expansion valve to decrease in a case where the first difference is less than the first preset value, so as to enhance the current subcooling degree of the main path of the subcooling heat exchanger;

adjusting the opening degree of the second expansion valve according to the relationship between the second difference and the second preset value, so as to make the second difference satisfy the second preset value, includes:

controlling the opening degree of the second expansion valve to increase in a case where the second difference is greater than or equal to the second preset value, so as to reduce the current superheat degree of the indoor heat exchanger; and controlling the opening degree of the second expansion valve to decrease in a case where the second difference is less than the second preset value, so as to enhance the current superheat degree of the indoor heat exchanger; and adjusting the opening degree of the third expansion valve according to the relationship between the third difference and the third preset value, so as to make the third difference satisfy the third preset value, includes:

controlling the opening degree of the third expansion to increase in a case where the third difference is greater than or equal to the third preset value, so as to reduce the current superheat degree of the discharge of the compressor; and controlling the opening degree of the third expansion to decrease in a case where the third difference is less than the third preset value, so as to enhance the current superheat degree of the discharge of the compressor.

20. The control method according to claim 18, wherein adjusting the opening degree of the first expansion valve according to the relationship between the fourth difference and the fourth preset value, so as to make the fourth difference satisfy the fourth preset value, includes:

controlling the opening degree of the first expansion valve to increase in a case where the fourth difference is greater than or equal to the fourth preset value, so as to reduce the current superheat degree of the outdoor heat exchanger; and controlling the opening degree of the first expansion valve to decrease in a case where the fourth difference is less than the fourth preset value, so as to enhance the current superheat degree of the outdoor heat exchanger; and adjusting the opening degree of the second expansion valve according to the relationship between the fifth difference and the fifth preset value, so as to make the fifth difference satisfy the fifth preset value, includes:

controlling the opening degree of the second expansion valve to increase in a case where the fifth difference is greater than or equal to the fifth preset value, so as to reduce the current subcooling degree of the indoor heat exchanger; and controlling the opening degree of the second expansion to decrease in a case where the fifth difference is less than the fifth preset value, so as to enhance the current subcooling degree of the indoor heat exchanger.

* * * * *